United States Patent [19]

Omura

[11] Patent Number: 4,891,781
[45] Date of Patent: Jan. 2, 1990

[54] MODULO ARITHMETIC PROCESSOR CHIP

[75] Inventor: Jimmy K. Omura, Cupertino, Calif.

[73] Assignee: Cylink Corporation, Sunnyvale, Calif.

[21] Appl. No.: 289,124

[22] Filed: Dec. 22, 1988

Related U.S. Application Data

[63] Continuation of Ser. No. 142,328, Jan. 4, 1988, abandoned, which is a continuation of Ser. No. 21,660, Mar. 4, 1987, abandoned.

[51] Int. Cl.[4] .............................................. G05F 7/05
[52] U.S. Cl. ................................ 364/768; 364/746.1; 380/28; 380/30
[58] Field of Search .................... 380/28–30, 380/33, 41, 44, 49, 50; 364/768, 761, 754, 746.1

[56] References Cited

U.S. PATENT DOCUMENTS

| | | | |
|---|---|---|---|
| 3,522,374 | 7/1970 | Abrahamson et al. | 380/50 |
| 3,657,476 | 4/1972 | Aiken | 380/28 |
| 3,781,472 | 12/1973 | Goode et al. | 380/44 |
| 3,796,830 | 3/1974 | Smith | 380/49 |
| 3,798,359 | 3/1974 | Feistel | 380/49 |
| 3,868,631 | 2/1975 | Morgan et al. | 380/49 |
| 3,876,832 | 4/1975 | Morgan et al. | 380/28 |
| 3,958,081 | 5/1976 | Ehrsam et al. | 380/29 |
| 3,962,539 | 6/1976 | Ehrsam et al. | 380/49 |
| 3,979,558 | 9/1976 | Peterson | 380/41 |
| 4,037,093 | 7/1977 | Gregg et al. | 364/754 |
| 4,162,480 | 7/1979 | Berlekamp | 364/754 |
| 4,200,770 | 4/1980 | Hellman et al. | 380/30 |
| 4,218,582 | 8/1980 | Hellman et al. | 380/30 |
| 4,251,875 | 2/1981 | Marver et al. | 364/754 |
| 4,405,829 | 9/1983 | Rivest et al. | 380/30 |
| 4,424,414 | 1/1984 | Hellman et al. | 380/30 |
| 4,538,240 | 8/1985 | Carter et al. | 364/754 |
| 4,567,600 | 1/1986 | Massey et al. | 380/33 |
| 4,574,361 | 3/1986 | Inagawa et al. | 364/761 |
| 4,587,627 | 5/1986 | Omura et al. | 364/754 |
| 4,697,248 | 9/1987 | Shirota | 364/754 |

OTHER PUBLICATIONS

Barney, Clifford, "Cypher Chip Makes Key Distribution a Snap", *Electronics*, Aug. 7, 1986.

Matyas, Stephen M., "Pubic Key Registration", (no date available).

Pohlig, Stephen C. and Martin E. Helman, "An Improved Algorithm over GF(p) and Its Cryptographic Significance", IIII Transactions on Information Theory, vol. IT-24, No. 1, Jan. 1978.

Neuwirth, Lee, "A Comparison of Four Key Distribution Methods", *Telecommunications*, Jul., 1986.

Abbruscato, C. R., "Data Encryption Equipment", *IEEE Communications Magazine*, vol. 22, No. 9, Sep. 1984.

Beth, T., Cook, B. M., Gollmann, D., "Architectures for Exponentiation in $GF(2^n)$".

Brickell, Ernest F., "A Fast Modular Multiplication Algorithm with Application to Two Key Cryptography".

Orton, G. A., Roy, M. P., Scott, P. A., Peppard, L. E., and Tavares, S. E., "VLSI Implementation of Public–Key Encryption Algorithms," Department of Electrical Engineering, Queen's University.

Barrett, Paul, MSc (Oxon), "Implementing the Rivest Sharmir and Adleman Public Key Encryption Algorithm on a Standard Digital Signal Processor," Computer Security Ltd., Aug., 1986.

(List continued on next page.)

*Primary Examiner*—Salvatore Cangialosi
*Attorney, Agent, or Firm*—David B. Newman, Jr.

[57] ABSTRACT

The present invention provides for a processor chip for computing addition, multiplication, and exponentiation in a Galois Field of integers modulo a prime number p, GF(p). The invention includes twelve registers for storing n-bit integers, a full adder for shifting left and adding data stored in two of the registers. A feedback register is included for storing a n-bit number and means for generating a feedback number is provided, wherein the feedback number is generated from a prime number, p. Also included are modulo means for reducing data bits stored in the registers modulo a prime number p.

44 Claims, 9 Drawing Sheets

OTHER PUBLICATIONS

Sedlak, H. and Golze, U., "An RSA Cryptography Processor," Institute for Theorebisch Informatik Technische University, Braunschweig.

Rankine, Gordon, Dr., "Thomas—A Complete Single Chip RSA Device".

Rivest, Ronald L., "RSA Chips (Past/Present/Future), MIT Laboratory for Computer Science".

Kochanski, Martin, "Developing an RSA Chip", Business Simulations, Ltd.

Diffie, W. and M. E. Hellman, "New Directions in Cryptography", IEEE Transaction in Information Theory, vol. IT-22, No. 6, Nov. 1976, pp. 644–654.

Stewart, B. M., Theory of Numbers, The Macmillan Co., 1952, pp. 111–112, and 133–135.

Clifford Barney, "Cypher Chip Makes Key Distribution a Snap," *Electronics*, Aug. 7, 1986, p. 30.

Fig. 5

| | L-1 | | m-n | o |
|---|---|---|---|---|
| | | $F_4$ | | 0 |
| | | $F_3$ | | 0 |
| | | $F_1$ | | 0 |
| | | | L-m | |
| | | Z | | 0 |
| | | X | | 0 |
| | | Y | | 0 |
| 0 | | $A_1$ | | |
| 0 | | $A_2$ | | |
| | | $B_1$ | | 0 |
| | | $B_2$ | | 0 |
| | | $C_1$ | | 0 |
| | | $C_2$ | | 0 |

MODULO ARITHMETIC PROCESSOR CHIP

This application is a continuation of Ser. No. 07/021,066, filed Mar. 4, 1987, and Ser. No. 07/142,328, filed Jan. 4, 1988, which are now abandoned.

BACKGROUND OF THE INVENTION

This invention relates to a processor chip for computing addition, multiplication, and exponentiation in the Galois Field of integers modulo a prime number.

DESCRIPTION OF THE PRIOR ART

Cryptographic systems transmitting a computationally secure cryptogram which is generated from a publicly known transformation of a message sent by a transmitter have been described in several patents, including U.S. Pat. No. 4,200,770 to Hellman at el., U.S. Pat. No. 4,405,829 to Revest at el., U.S. Pat. No. 4,218,582 to Hellman et el., and U.S. Pat. No. 4,424,414 to Hellman et el. These patents in general, teach the broad concept of using a secure cipher key that is generated by a set of conversers from transformations of exchange transform signals. A set of conversers each possess a secret signal and exchange an initial non-secret transformation of the secret signal with the other converser. The received non-secret transformation of the other converser's secret signal is again transformed with the receiving converser's secret signal to generate a secure cipher key. The transformations use known operations that are easily performed but extremely difficult to invert. It is believed infeasible for an eavesdropper to invert the initial non-secret transformation to obtain either converser's secret signal, or duplicate the latter transformation and obtain the secure cipher key.

None of these patents teach the particular means or apparatus necessary for implementing their broad inventive concepts. In particular, none of these patents teach how to build a processor chip for performing the necessary transformations for passing a secure key.

Further, none of these patents teach or suggest how to implement these transformations in rapid fast method on a processor chip.

OBJECTS AND SUMMARY OF THE INVENTION

An object of the present invention is to provide a processor chip for computing addition, multiplication, and exponentiation in the Galois Field of integers modulo a prime number p.

Another object of the present invention is to provide a processor chip for performing an exponentiation operation in a rapid manner.

According to the present invention, as embodied and broadly described herein, a processor chip for adding a first integer having n-bits to a second integer having n-bits, wherein the first integer plus the second integer equals a third integer having n-bits, modulo a fourth integer having n-bits, is provided, comprising first register means for storing the first integer, second register means for storing the second integer, and feedback means for generating and storing a feedback number. The feedback number is the two's complement of the fourth integer. The present invention includes arithmetic means coupled to the first register means and the second register means. The arithmetic means is for adding the first integer to the second integer, thereby generating the third integer. The third integer is then stored in accumulator means which is coupled to arithmetic means. The invention further includes overflow means coupled to the accumulator means for storing an overflow integer which is overflowed from the third integer. Additionally, means is provided for fetching the feedback number into the second register and adding the feedback number using arithmetic means to the third integer in the accumulator means. Also, means coupled to the accumulator means and responsive to the third integer being greater than the fourth integer, is provided for reducing the third integer modulo the fourth integer.

A second aspect of the present invention includes a modulo arithmetic processor chip for multiplying a first integer having n-bits by a second integer having n-bits, wherein the first integer times the second integer equals a third integer having n-bits, modulo a fourth integer having n-bits. The modulo arithmetic processor chip for multiplying includes first register means for storing the first integer, second register means for storing the second integer, feedback means for generating a feedback number, wherein the feedback number equals the two's complement of the fourth integer, and arithmetic means coupled to the first register means and the second register means, and responsive to the least significant position of the first integer shifted right from the first register means, for adding the second integer to the third integer. Accumulator means is provided coupled to the arithmetic means for storing the third integer. Also included is overflow means coupled to the accumulator means for counting and storing overflow bits as an overflow integer and second partial reduction means coupled to the overflow means, the feedback means, the first register means and the second register means, and responsive to the completion of multiplying the first integer by the second integer, for transferring the overflow integer into the first register means, transferring the feedback number into the second register means, and multiplying the feedback number by the overflow integer to generate a product, and adding the product to the third integer in the accumulator register means. Means is provided coupled to the accumulator means and responsive to the third integer being greater than the fourth integer, for reducing the third integer modulo the fourth integer. Also, first partial reduction means is included coupled to the second register means and responsive to the most significant position of the second integer shifted left from the second register means, for adding the feedback number to the second integer, thereby partially reducing the second integer.

Additional objects and advantages of the invention will be set forth in the description which follows, and in part will be obvious from the description, or may be learned by practice of the invention.

BRIEF DESCRIPTION OF THE DRAWINGS

The accompanying drawings, which are incorporated in and constitute part of this specification, illustrate a preferred embodiment of the invention, and together with the description, serve to explain the principles of the invention.

FIG. 5 illustrates the registers configuration of the present invention;

DETAIL DESCRIPTION OF THE PREFERRED EMBODIMENTS

Figure 1:
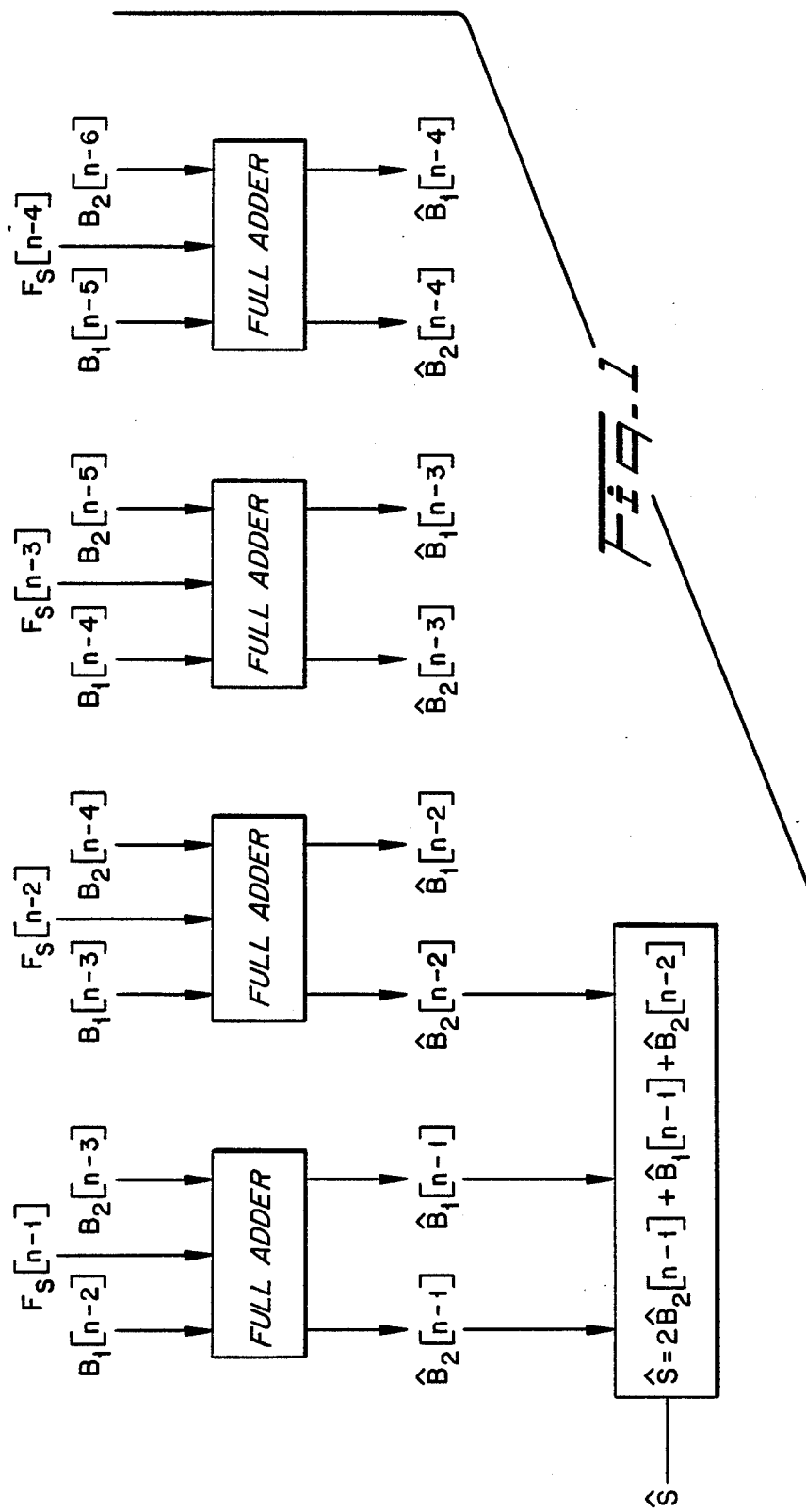
FIG. 1 illustrates the shifting operation of the processor chip of the present invention.

Reference will now be made in detail to the present preferred embodiments of the invention, an example of which is illustrated in the accompanying drawings.

A preferred embodiment of the present invention includes an X register having L-bits storage for storing an N-bit integer X, a Y register having L-bits storage for storing an N-bit integer Y, and first and second A registers for storing L-bits each. The invention includes means for transforming the N-bit integer X from X register into first and second alternate integers having L-bits each and storing first and second alternate integers in the first and second registers A. Also included are control means connected to the first and second registers for generating control signal.

First and second B registers for storing L-bits each, and first and second C registers for storing L-bits each are coupled to a full adder. The control logic also is coupled to the full adder, and the full adder is responsive to a control signal being a 1-bit from the control logic, for shifting left and adding data stored in the first and second B registers to data stored in the first and second C registers. The full adder is responsive to the control logic signal being a 0-bit for shifting left data in the first and second B registers. A feedback register having L-bits for storing an N-bit feedback number is included along with means for generating a feedback number from a prime number, p, having N-bits and storing the feedback number in the feedback register. Modulo means is coupled to the feedback register and the first and second C register for reducing data bits stored in the first and second C registers modulo the prime number p and means for converting data bits in the first and second C registers to an L-bit integer and storing the L bit integer in the Y register.

The processor chip of the present invention computes addition, multiplication, and exponentiation in the Galois Field of integers modulo a prime number p, GF(p). For large prime numbers, several chips can be cascaded together to function as an equivalent single larger chip. Also these chips can be used for computing exponentiation in the ring of integers modulo a composite number, the factorization of which is kept secret, such as in the RSA public key cryptographic scheme. The following discussions focus on the Galois Field GF(p) where p is a prime number.

Assume the prime number p is an n-bit number with the radix-two form (usual binary representation)

$$p = P[n-1]2^{n-1} + P[n-2]2^{n-2} + \ldots + P[1]2 + P[0]$$

where $\{P[i]\}$ are binary symbols. It is convenient to also use the two's complement form of p, $$p = 2^n - F[n-1]2^{n-1} - F[n-2]2^{n-2} - \ldots - F[1]2 = F[0]$$

where $\{F[i]\}$ are binary symbols. Since p is equivalent to zero in GF(p), one has the relationship $$2^n \bmod p = F[n-1]2^{n-1} + F[n-2]2^{n-2} + \ldots + F[1]2 + F[0]. \quad (1)$$

Thus, $2^n$ is equivalent to an n-bit binary number with radix-two form having bits $\{F[i]\}$. This fact is used extensively in reducing all integers to n-bit representations. Here $\{F[i]\}$ are called "feedback bits."

Consider exponentiation in GF(p). Let X be an element of GF(p) and Z an m-bit integer represented by $$Z = Z[m-1]2^{m-1} + Z[m-2]2^{m-2} + \ldots + Z[1]2 + z[0].$$

Any element of GF(p) such as X also has a representation given by $$X = X[n-1]2^{n-1} + X[n-2]2^{n-2} + \ldots + X[1]2 + X[0].$$

Here $\{Z[i]\}$ and $\{X[i]\}$ are binary symbols. Consider computing the following:

$$Y = X^Z \bmod p$$

where Y is, of course, an element in GF(p). The basic operations of exponentiation for this processor chip are derived by the following equation:

$$\begin{aligned}
X^Z &= X^{Z[0] + 2Z[1] + 2^2 Z[2] + \ldots + 2^{m-1} Z[m-1]} \\
&= X^{Z[0]} (X^2)^{Z[1]} (X^{2^2})^{Z[2]} \ldots (X^{2^{m-1}})^{Z[m-1]} \\
&= X^{Z[0]} \{X^{Z[1]} (X^2)^{Z[2]} \ldots (X^{2^{m-2}})^{Z[m-1]}\}^2 \\
&= X^{Z[0]} \{X^{Z[1]} \{X^{Z[2]} \ldots (X^{2^{m-3}})^{z[m-1]}\}^2\}^2.
\end{aligned}$$

Note that by defining $$E_k = X^{Z[m-k]} (X^2)^{Z[m-k+1]} \ldots (X^{2^{k-1}}) Z[m-1] \quad k = 1, 2, \ldots, m$$

one has the exponentiation algorithm $$\begin{aligned}
E_1 &= X^{Z[m-1]}, \\
E_k &= X^{Z[m-k]} E_{k-1}^2 \\
k &= 2, 3, \ldots, m
\end{aligned}$$

where $$X^Z = E_m$$

and $$Y = E_m \bmod p$$

Exponentiation comprises a series of multiplications modulo p. For any two integers A and B $$AB \bmod p = (A \bmod p)(B \bmod p) \bmod p$$

Thus each product of integers modulo p needs not be reduced until all products that form the exponentiation is completed. In addition, a partial reduction at each stage can be performed using the relationship in Eq. (1). This partial reduction allows representing all integers by n binary symbols.

MULTIPLY ALGORITHM

The heart of the processor chip is the GF(p) multiply operation. Consider two n-bit integers A and B that belong to GF(p). These are any two integers less than p. Consider the required multiplier operation $$C = AB \bmod p.$$

A, B, and C are referred to as the "multiplier," the "multiplicand," and the "product," respectively.

A. Alternative Representation

As noted above an element A in GF(p) can be uniquely represented by n binary symbols $\{A[i]\}$ as $$A = A[n-1]2^{n-1} + A[n-2]2^{n-2} + \ldots + A[1]2 + A[0].$$

To avoid carry propagation when two such n-bit integers are added, consider an alternative non-unique representation of the form $$\begin{aligned} A &= A_1 + A_2 2 \\ &= A_1[n-1]2^{n-1} + A_1[n-2]2^{n-2} + \ldots + A_1[1]2 + \\ & \quad A_1[0] + A_2[n-1]2^n + A_2[n-2]2^{n-1} + \\ & \quad \ldots + A_2[1]2^2 + A_2[0]2 \end{aligned}$$

where $\{A_1[i]\}$ and $\{A_2[i]\}$ are binary symbols. There are many pairs of n bits that represent the same integer in this representation. The $i^{th}$ components of $A_1$ and $A_2$, $A_1[i]$ and $A_2[i]$, define the $i^{th}$ integer component $$A[i] = A_1[i] + A_2[i]2$$

which is a 2-bit integer having values of 0, 1, 2, or 3. B and C are represented in the same form, where for B, $$\begin{aligned} B &= B_1 + B_2 2 \\ &= B_1[n-1]2^{n-1} + B_1[n-2]2^{n-2} + \ldots + B_1[1]2 + \\ & \quad B_1[0] + B_2[n-1]2^n + B_2[n-2]2^{n-1} + \ldots + \\ & \quad B_2[1]2^2 + B_2[0]2. \end{aligned}$$

The $i^{th}$ components of $B_1$ and $B_2$, given by $B_1[i]$ and $B_2[i]$, form the $i^{th}$ integer component of B, $$B[i] = B_1[i] + B_2[i]2$$

which is also a 2-bit integer having values less than or equal to 3. In this non-unique representation, integers A, B, and C are represented by n 2-bit integer components.

Since the above alternative representations for A, B, and C are not unique, there is some freedom to choose representations that are easy to implement. Specific forms are described next which assume there are two n-bit registers for the multiplier A, for the multiplicand B, and for the product C.

B. Multiplier

A "shift and add" multiplier includes having the "multiplier" $A = A_1 + A_2 2$, which is held in two n-bit registers, being shifted to the right (Higher order bits are on the left) into a control logic that computes a "sum" and "carry." The "sum" bit is used to control the adding of the shifted "multiplicand" $B = B_1 + B_2 2$ integer to the "product" accumulator given by $C = C_1 + C_2 2$. The control logic for the multiplier is at the right end of the $A_1$ and $A_2$ n-bit registers. It has binary variables $r_1$, $r_2$, and $A_{21}$ originally set to zero. This logic computes integers $$\hat{r} = r_2 + A_{21} + A_1[0]$$

and $$\hat{A}_{21} + A_2[0]$$

where $\hat{r}$ is a 2 bit integer of the radix-two form $$\hat{r} = \hat{r}_1 + \hat{r}_2 2.$$

During each shift to the right of the multiplier registers $A_1$ and $A_2$, $r_1$ is set to $\hat{r}_1$, $r_2$ is set to $\hat{r}_2$, and $A_{21}$ is set to $\hat{A}_{21}$.

The multiplier logic at the right end of the $A_1$ and $A_2$ registers merely converts the non-unique n-bit radix-two form where the resulting bits $\{\hat{r}_1\}$ are used to control the adding of the shifted multiplicand registers $B_1$ and $B_2$ to the product accumulator registers $C_1$ and $C_2$.

C. Multiplicand

The multiplicand is held in two n-bit registers $B_1$ and $B_2$, which are shifted left (multiplied by 2). Before each left shift of the $B_1$ and $B_2$ registers, these register bits are added or not added to the product accumulator registers $C_1$ and $C_2$ depending on the multiplier logic output bit $\hat{r}_1$.

The multiplicand B has the form $$B = \sum_{i=0}^{n-1} (B_1[i] + 2B_2[i])2^i,$$

or on rearranging terms, the form $$B = \sum_{i=0}^{n-1} (B_1[i] + B_2[i-1])2^i + B_2[n-1]2^n.$$

Multiplying by 2 gives $$2B = \sum_{i=1}^{n-1} (B_1[i-1] + B_2[i-2])2^i + (2B_2[n-1] + B_1[n-1] + B_2[n-2])2^n.$$

Recall that each $2^n$ term can be replaced by the feedback terms using Eq. (1). The number of such $2^n$ terms is given by $$S = 2B_2[n-1] + B_1[n-1] + B_2[n-2]$$

and the feedback n-bit sequence is $$F_s = S2^n \bmod p.$$

Four possible non-zero feedback terms are defined as $F_1$, $F_2$, $F_3$, and $F_4$. Now the shifting operation of the B integer is given by Initial Condition: Load B and set $$S = 2B_2[n-1] + B_1[n-1] + B_2[n-2].$$

Shift according to:

$$\hat{B} = \sum_{i=0}^{n-1} (\hat{B}_1[i] + \hat{B}_2[i-1])2^i + \hat{B}_2[n-1]2^n$$

$$= \sum_{i=1}^{n-1} (B_1[i-1] + B_2[i-2])2^i + F_s$$

$$\hat{S} = 2\hat{B}_2[n-1] + \hat{B}_1[n-1] + \hat{B}_2[n-1].$$

Here B is the original register integer, and $\hat{B} = 2B$ is the shifted register integer. FIG. 1 illustrates this shifting operation using full adders.

D. Accumulator

At any given time, B has the form $$B = \sum_{i=0}^{n-1} (B_1[i] + B_2[i-1])2^i + B_2[n-1]2^n$$

If $r_1 = 1$, this is added to the integer C, which consists of two n-bit registers. The problem of handling overflow terms must be taken care of using Eq. (1). Since no shifting of the C register is involved, all the overflow terms are accumulated until all shifts and adds are completed. At the end of the shifts and adds, all the accumulated overflow terms are added to the C registers to obtain the final answer.

Figure 2:
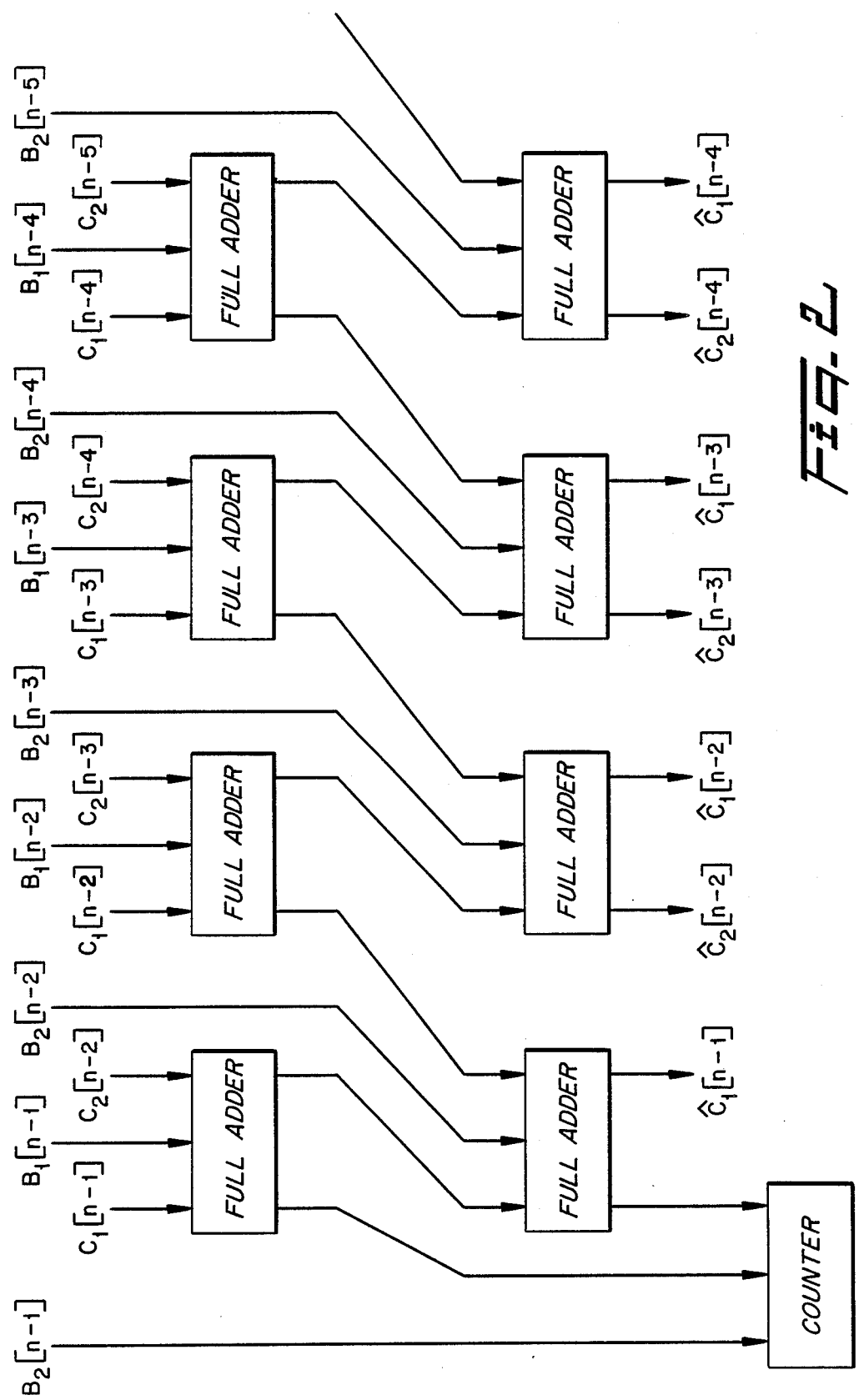
FIG. 2 illustrates the accumulator operation of the processor chip of the present invention.

Assuming $\hat{r}_1 = 1$, each adding of B to C is illustrated in FIG. 2 in terms of two sets of full adders. After all shifts and adds are completed, the counter contains an integer I and the final product AB mod p is obtained by adding $I2^n$ to the integer C contained in the two n-bit registers. This is done by replacing $2^n$ by $F_1 = 2^n$ mod p and adding $IF_1$ to the accumulator registers by restarting the shift and add operations with A replaced by I and B replaced by $F_1$ and starting with the current C register values. Again the operations shown in FIG. 2 is used. This is repeated until a shift and add cycle is completed and $I = 0$.

Note that if the original integers A and B consists of n bits each, then any shift of B adds less than two $2^n$ terms to C no more than n times. Thus the counter has count integer I that is no higher than 2n. For n = 8000, one only needs a 14-bit counter. Thus the counter value I is at most a 14-bit integer, and the shift and add cycles associated with adding $IF_1$ to the accumulator is short compared to the original shift and add cycle.

PRODUCT REDUCTION

When a multiply operation is completed, the contents in the two n-bit registers $C_1$ and $C_2$ can be transferred to the two n-bit registers $A_1$, $A_2$, and/or $B_1$, $B_2$ to continue the exponentiation algorithm. When the exponentiation algorithm is completed, it is desirable to reduce the integer C in the two n-bit registers to a single binary form $$C = \sum_{i=0}^{n-1} C_1[i]2^i$$

where $C_2[i] = 0$ for all $i = 0, 1, \ldots, n-1$.

Note that in the two n-bit form the integer C satisfies $$C = C_1[n-1]2^{n-1} + C_2[n-2]2^{n-2} + \ldots + C_1[0] +$$
$$C_2[n-2]2^{n-1} + C_2[n-3]2^{n-2} + \ldots + C_2[-1]$$
$$< 2^{n+1}$$

where $C_2[-1] = 0$ and $C_2[n-1] = 0$. Since $2^n + 2 = 2^{n+1}$, there can be at most one $2^n$ term in C in the usual n-bit representation. The conversion to this single n-bit form is given as follows:

| Step 1: | Set N | ← n |
| Step: | I | ← 0 |
| Step 2: | Set C | ← C + 0 |
| | N | ← N - 1 |
| Step 3: | Check N = 0 | |
| | If N = O, go to Step 4. | |
| | If N/O, go to Step 2. | |
| Step 4: | Check counter I | |
| | If I = 0, stop. | |
| | If I/O, Set C ← C + $F_1$ and go to Step 1. | |

One can see that this works by examining FIG. 2 with $B = 0$. Starting from the lowest order bits, the first $C + 0$ operation causes $C_2[0] = 0$, the second $C + 0$ operation causes $C_2[1] = 0$, etc.

REDUCTION MODULO-p

The single n-bit representation of C is $$C = \sum_{i=0}^{n-1} C_1[i]2^i < 2^n.$$

Assume that the highest order bit of p is one. Then $$p = \sum_{i=0}^{n-1} P[i]2^i$$

where $P[n-1] = 1$. This is not a restriction since n is by definition the number of bits necessary to represent p. Thus $$p \geq 2^{n-1}$$

or $$2p \geq 2^n$$

and $$C < 2p.$$

If the representation of C is greater than p, that is, $$C > p,$$

then it is desirable to convert C to C-p by performing the following steps:

| Step 1: | Set Y | ← C |
| Step 2: | Set C | ← C + $F_1$ |
| Step 3: | Set N | ← n |
| | I | ← 0 |
| Step 4: | Set C | ← C + 0 |
| | N | ← N - 1 |

-continued

```
Step 5:    Check N       =
                         0
           If N = 0, go to Step 6.
           If N/O, go to Step 4.
Step 6:    Check counter I
           If I = 0, stop.
           If I/O, set Y ← C and stop.
```

To show that this is correct, not that the final answer is either the single n-bit representation C which satisfies $$0 \leq C < 2p$$

or if this is greater than p, it is C−p which satisfies $$0 \leq C-p < p.$$

Since $$p = 2^n - F_1$$

then $$C + F_1 = 2^n + (C-p).$$

If after reducing $C+F_1$ into a single n-bit representation, one has $I \neq 0$, then $C-p \geq 0$ or $C \geq p$ and accept the latest contents of the $C_1$ register as the answer. Otherwise, if $I=0$, the original $C_1$ register value (before adding $F_1$) is the desired answer.

PROCESSOR CHIP

The following presents the general features of GF(p) processor chip that computes $$Y = X^Z \bmod p$$

$$Y = XZ \bmod p$$

and $$Y = +X+Z \bmod p.$$

A. Basic Structure

Figure 3:
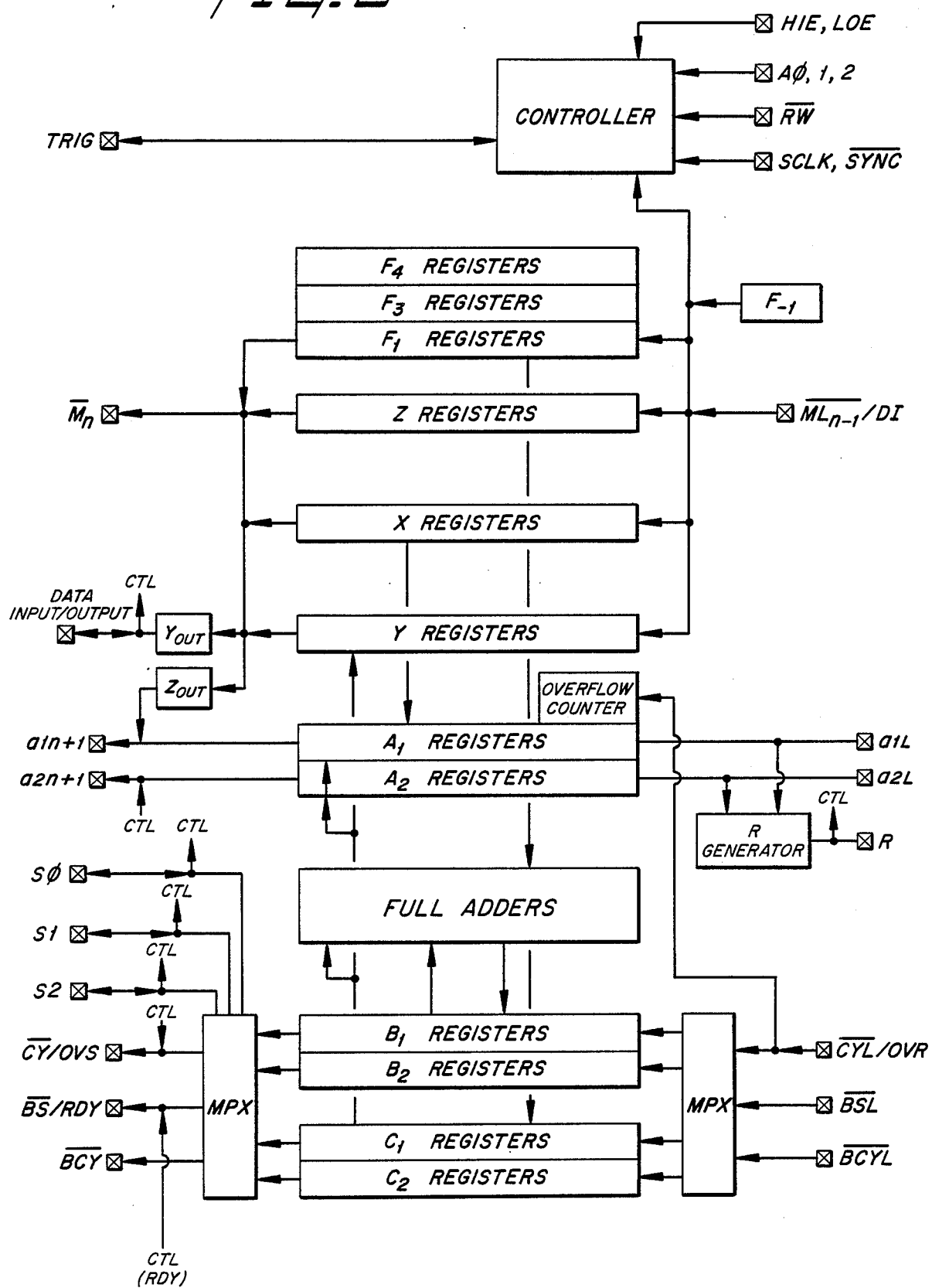
FIG. 3 illustrates the basic structure of the processor chip of the present invention.

The processor chip has the basic structure illustrated in FIG. 3, comprising of 12 L-bit registers, L full adders, and control and feedback logic. The prime number feedback terms $F_3$ and $F_4$ are computed from input $F_1$ while $F_2$ is merely a shift of $F_1$. Other inputs to this chip are the integer X and the integer Z. Assume that all these integers are represented by L bits and that the prime number p is an L-bit integer. The final exponentiation will be located in the L-bit registers Y. Anytime after loading the $F_1$, Z, and X registers, a start command can initiate the add, multiply, or exponentiation computation. Loading in these registers is not allowed during computations.

Since exponentiation consists of a sequence of multiply operations, C=AB, the basic structure of FIG. 3 is primarily a GF(p) multiplier. The final answer ends up in the L-bit registers $C_1$, which is then loaded into the Y registers. The Y registers can only be read out after all computations are executed.

The bulk of the basic structure consists of the set of 12 L-bit registers and L full adders. A vertical slice through this basic structure, is shown as the basic cell of FIG. 4. The bulk of the basic structure of FIG. 3 includes identical copies of the basic cell shown in FIG. 4 that are cascaded L times much like a set of register cells.

Figure 4:
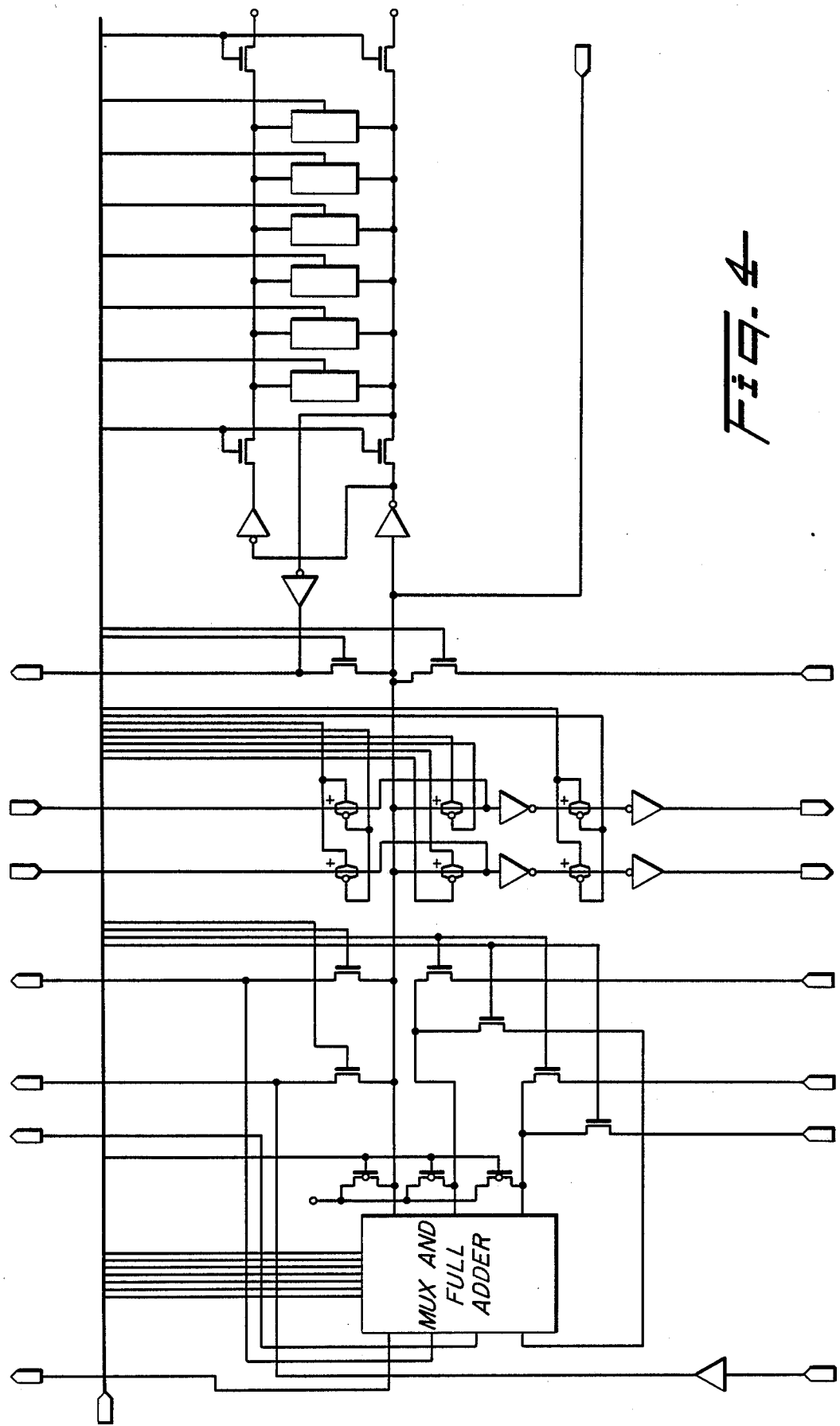
FIG. 4 illustrates the basic cell of the processor chip of the present invention.

The basic cell consists of 12 registers and single full adder which is time shared to do the operations shown in FIGS. 1 and 2. Illustrated in FIG. 4 are load lines and communication lines where a basic cell receives inputs from two right adjacent cells and sends outputs to two left adjacent cells. Also there is a control bit $\hat{r}_1$ that goes to all cells from right to left and three feedback bits $\hat{s}_0$, $\hat{s}_1$, and $\hat{s}_3$ that goes to all cells from left to right.

B. Mismatch

Up to this point, the processor chip includes L basic cells and, therefore, all integers of interest are L-bit integers. The prime number p also was assumed to be an L-bit prime integer.

Consider the processor chip having L basic cells as before but now the prime number is represented by n bits where $n \leq L$ and Z is represented by m bits. The chip structure of L basic cells can be used to obtain the desired exponentiation.

For an n-bit prime, the integer X is an n-bit integer and the result of addition, multiplication, or exponentiation is also an n-bit integer. To allow for the mismatch between L and n, the n-bit integers X and F are loaded into the highest n-bit register positions of the X and F registers. The highest m-bit positions of the Z registers are loaded with the m-bit integer Z. This is shown in FIG. 5. Essentially, only the upper n cells of the L cell chip are used. The only modification required here is that, at the beginning of each multiplication, the $A_1$ and $A_2$ registers must be shifted right by $q=L=n$ steps so that the right end logic is synchronized correctly.

C. Modular Chip

For large prime numbers, it may be impractical to place all basic cells in a single chip. Thus, a modular design is used where there are L basic cells on a single chip. Thus a single chip can compute exponentiation for any n-bit prime number p where $n \leq L$. In the modular chip design, two chips in cascade can act like a single chip with 2L basic cells and handle prime numbers where $n \leq 2L$. The modular design is such that K modular chips in cascade behaves like a single chip of KL basic cells that can compute exponentiation in GF(p) where p is an n-bit prime with $n \leq KL$.

To achieve this modular design, consider the structure of FIG. 3 to represent a modular chip where the left end logic circuits can be disengaged by an input control pin and the right end logic circuits can be disengaged by another input control pin. Input and output pins are located on each chip to allow two chips to connect together so that the sequence of the basic cells continue from one chip to the next chip. Thus all chips have L basic cells and all the end logic circuits as shown in FIG. 3. The primary modification is that the end logic circuits can be disengaged, and chips can be connected to continue the cascade of basic cells.

A cascade of K modular chips then has a left most chip with its left logic circuits engaged and its right logic circuits disengaged. The K-2 intermediate chips have all end logic circuits disengaged while the right most chip has its left logic circuits disengaged and its right logic circuits engaged. Since the end logic circuits take up only a small fraction of each modular chip, there is little total chip area lost to the unused end logic circuits. In addition to the end logic circuits shown in FIG. 1, there is the overall chip controller that also is duplicated on each chip although only used on the left most chip in a cascade of modular chips. This chip controller, which also takes up little chip area, is described next.

CHIP CONTROLLER

Assume there are K modular chips cascaded to form KL basic cells. Let n be the number of bits in the representation of the prime p, $$p = 2^n - \sum_{i=0}^{n-1} F[i]2^i.$$

Related control parameters are n, m, and q where
n = number of bits representing p
m = number of bits representing z
q = KL − n
With these parameters entered into control registers, the n-bit inputs X and F and m-bit input Z are entered before each calculation.

A. Basic Subroutines

Multiplication is represented in flowcharts as,

MPY overflow compensation is represented as,

OVF

Compensation and the two n-bit to one n-bit reduction is represented as,

2→1

Reduction

Figure 6:
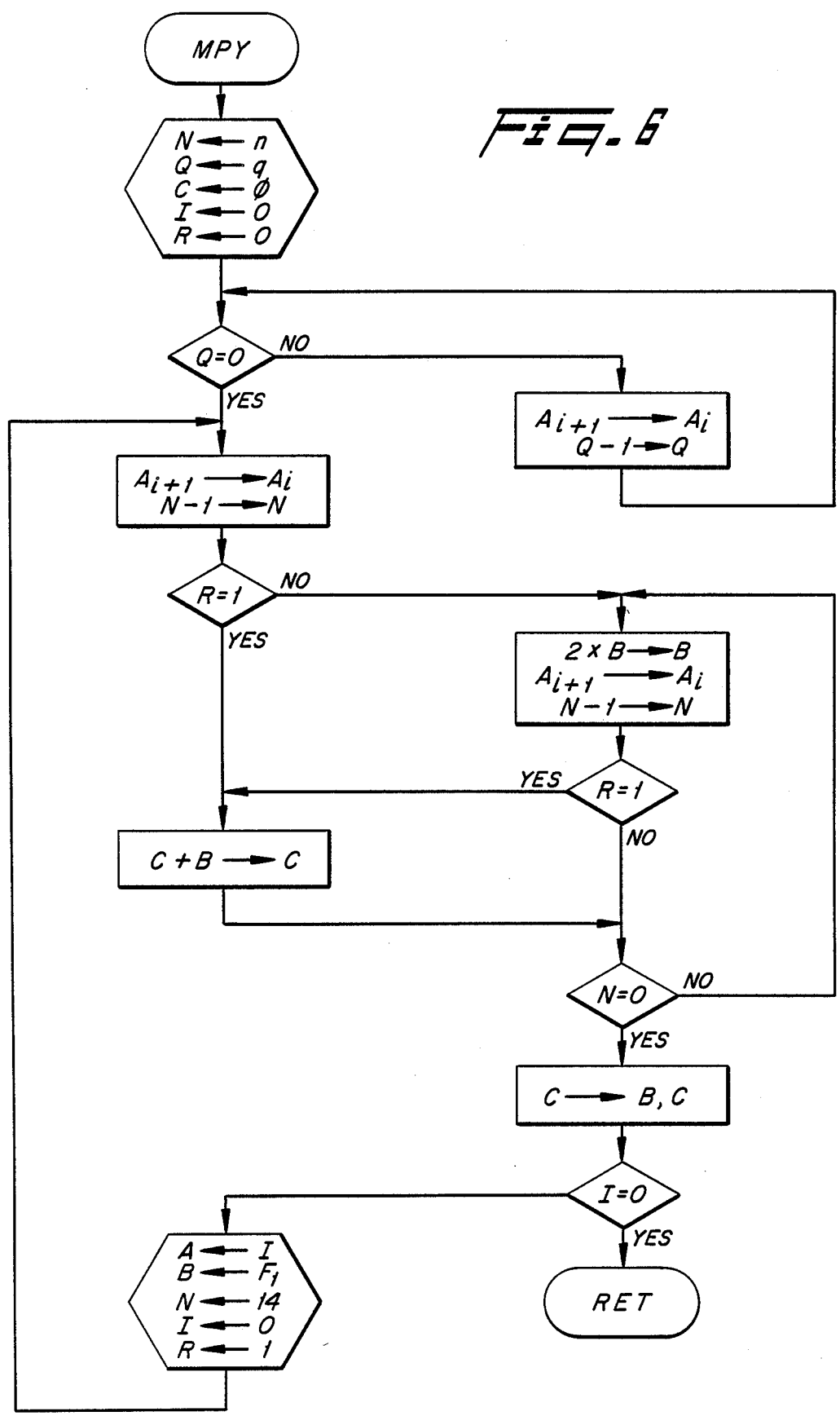
FIG. 6 illustrates the multiply sub-routine of the present invention.
Figure 7:
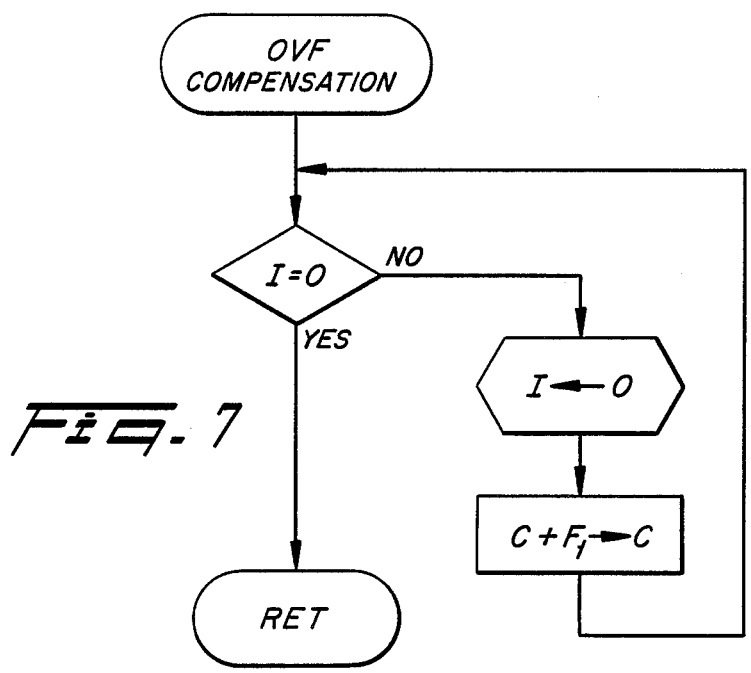
FIG. 7 illustrates the overflow compensation sub-routine of the present invention.
Figure 8:
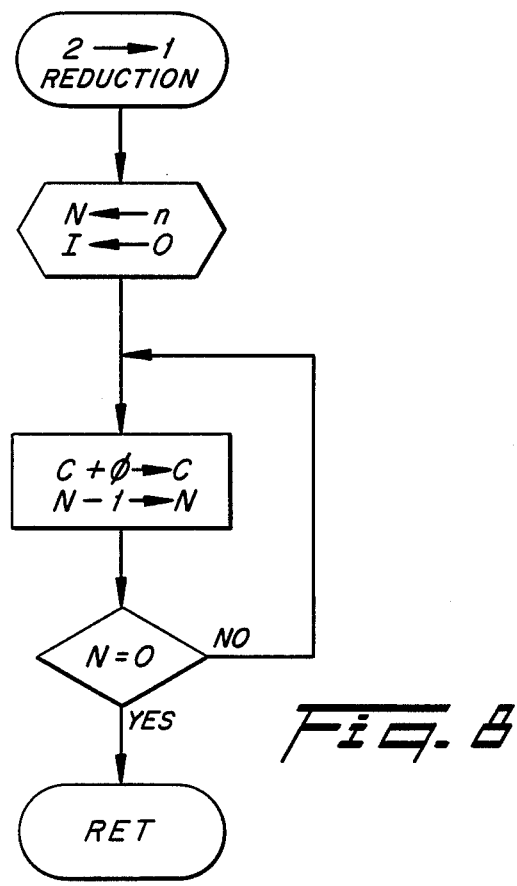
FIG. 8 illustrates the two N-bit to one N-bit reduction sub-routine of the present invention.

The three subroutines are shown in FIGS. 6, 7, and 8. The counter in FIG. 2 has count integer denoted I, which is the overflow index used in these subroutines.

Multiplication is the most common subroutine used in exponentiation. Overflow compensation is used to check for a $2^n$ term in the counter (see FIG. 2) and, if so, apply a feedback term using Eq. (1). The two n-bit to one n-bit reduction forces n additions of 0 to C.

B. Calulation of Feedback Terms

Recall that we have the feedback term $$F_s = S2^n \bmod p$$

or $$F_1 = \sum_{i=0}^{n-1} F[i]2^i,$$

$$F_2 = 2F_1 = \sum_{i=1}^{n-1} F[i-1]2^i,$$

$$F_3 = F_2 + F_1 \bmod p,$$

and $$F_4 = F_3 + F_1 \bmod p.$$

Figure 9:
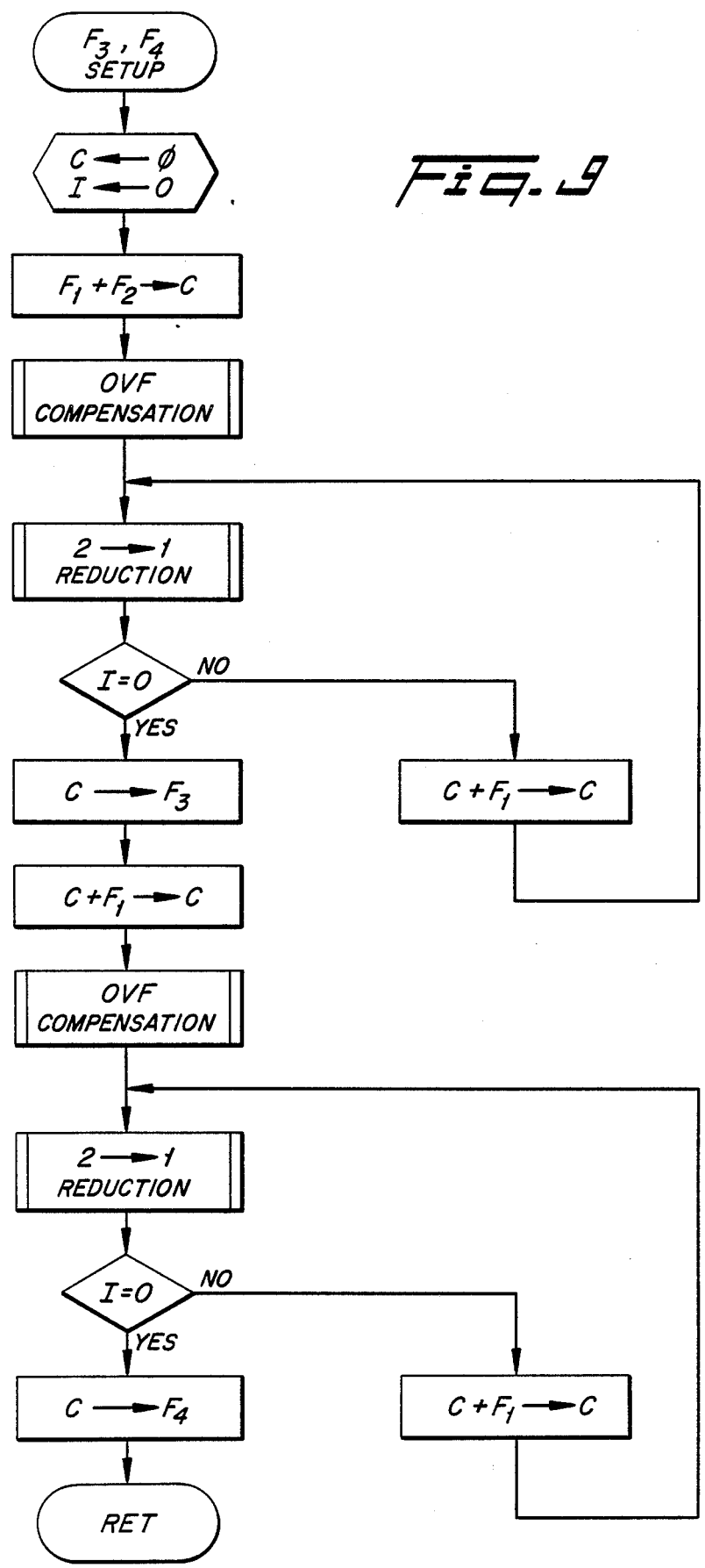
FIG. 9 illustrates the $F_3$ and $F_4$ set up of the present invention.

Since the prime number has the highest order bit $P[n-1] = 1$, we have $F[n-1] = 0$. Thus $F_2$ can be obtained from $F_1$ by a simple shift since that does not result in a number with a $2^n$ term. $F_3$ and $F_4$, however, may require a mod p reduction. Only $F_1$, $F_3$, and $F_4$ are stored in registers. $F_3$ and $F_4$ are computed using the flow diagram of FIG. 9.

C. Overall Control Program

Figure 10:
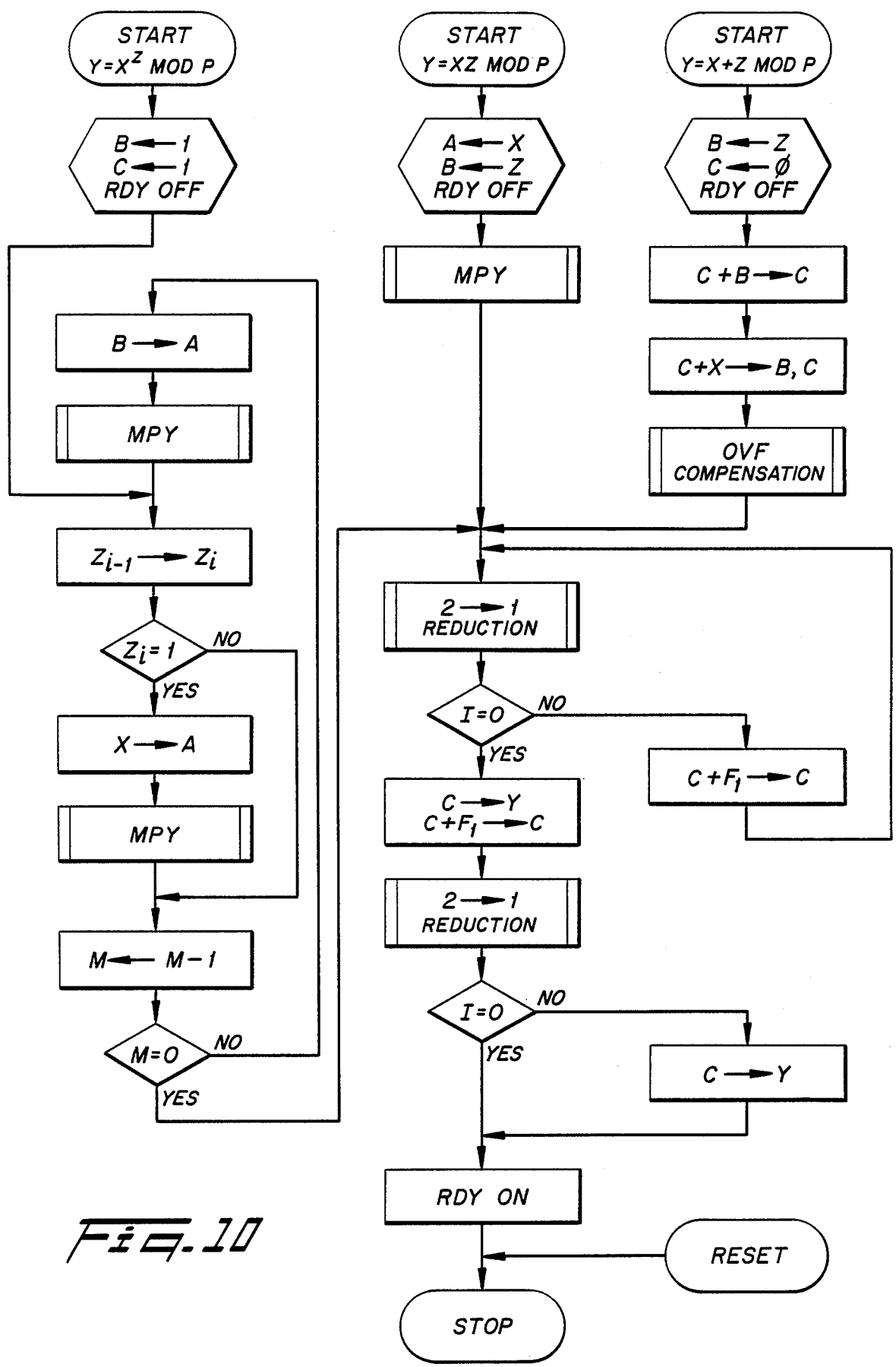
FIG. 10 is an overall flow chart of the processor chip of the present invention.

Using the subroutines described above, the overall control flowchart is shown in FIG. 10. This consists of three separate functions of exponentiation, multiplication, and addition followed by a common part that first reduces the answer in the $C_1$ and $C_2$ registers into a single n-bit form in $C_1$ and then completes the final mod p reduction.

It will be apparent to those skilled in the art that various modifications can be made to the Galois field processor chip of the instant invention without departing from the scope or spirit of the invention, and it is intended that the present invention cover modifications and variations of the Galois field processor chip provided they come within the scope of the appended claims and their equivalents. Further, it is intended that the present invention cover present and new applications of the Galois field processor, including smart cards, public key management for encryption, and message authentication.

I claim:

1. An apparatus for computing multiplication in the ring of integers modulo an integer number, p, comprising:

an X register having L-bits for storing an n-bit integer X;

a Y register having L-bits for storing an n-bit integer Y;

first and second A registers for storing L-bits each;

means for transforming the n-bit integer X from X register into first and second alternate integers having L-bits each and storing first and second alternate integers in said first and second registers A;

control means connected to said first and second A registers for generating a control signal;

first and second B registers for storing L-bits each;

first and second C registers for storing L-bits each;

a full adder coupled to said first and second B registers, said first and second C registers, and said control logic, and responsive to the control signal being a 1-bit for shifting left and adding data stored in said first and second B registers to data stored in said first and second C registers, respectively, and responsive to the control signal being a 0-bit for shifting left data in said first and second B registers;

a feedback register having L-bits for storing an n-bit feedback number;

means for generating feedback number from the integer number, p, having n-bits and storing the feedback number in the feedback register;

modulo means coupled to said feedback register and said first and second C register for reducing data bits stored in said first and second C registers modulo the integer number p; and means for converting data bits in said first and second C registers to an L-bit integer and storing the L-bit integer in said Y register.

2. An apparatus for computing addition in the ring of integers modulo an integer number, p, comprising:

an X register having L-bits for storing an n-bit integer X;

a Y register having L-bits for storing an n-bit integer Y;

first and second A registers for storing L-bits each;

means for transforming the n-bit integer X from X register into first and second alternate integers having L-bits each and storing first and second alternate integers in said first and second registers A;

control means connected to said first and second A registers for generating a control signal;

first and second B registers for storing L-bits each;

first and second C registers for storing L-bits each;

a full adder coupled to said first and second B registers, said first and second C registers, and said control logic, and responsive to the control signal being a 1-bit for adding data stored in said first and second B registers to data stored in said first and second C registers, respectively; and means for converting data bits in said first and second C registers to an L-bit integer and storing the L-bit integer in said Y register.

3. The apparatus as set forth in claim 2, further comprising:

a feedback register having L-bits for storing an n-bit feedback number;

means for generating feedback number from the integer number, p, having n-bits and storing the feedback number in the feedback register; and modulo means coupled to said feedback register and said first and second C register for reducing data bits stored in said first and second C registers modulo the integer number p.

4. The apparatus for computing multiplication in the ring of integers modulo an integer number, p, as set forth in claim 1, further comprising:

means for computing exponentiation in the ring of integers modulo an integer number p from a series of multiplications modulo p according to $$X^Z = X^{Z[0]}\{X^{Z[1]}\{X^{Z[2]}\ldots(X^{2m-3})^{Z[m-1]}\}^2\}^2.$$

5. The apparatus as set forth in claim 1, further comprising:

an overflow counter coupled to said full adder for counting overflows, I, from said full adder; and wherein said full adder adds $I2^n$ to to said first and second C registers by replacing $2^n$ by the feedback number $F_1$ and adding $IF_1$ to the accumulator registers.

6. The apparatus as set forth in claim 2, further comprising:

an overflow counter coupled to full adder for counting overflows, I, from said full counter; and wherein said full adder adds $I2^n$ to to said first and second C registers by replacing $2^n$ by the feedback number $F_1$ and adding $IF_1$ to the accumulator registers.

7. The apparatus as set forth in claim 3, further comprising:

an overflow counter coupled to full adder for counting overflows, I, from said full counter; and wherein said full adder adds $I2^n$ to to said first and second C registers by replacing $2^n$ by the feedback number $F_1$ and adding $IF_1$ to the accumulator registers.

8. A modulo arithmetic processor chip for adding a first integer A having n-bits to a second integer B having n-bits, wherein the first integer A plus the second integer B equals a third integer C having n-bits, modulo a fourth integer p having n-bits, comprising:

first register means for storing the first integer A;

second register means for storing the second integer B;

feedback means for generating and storing a feedback number F, wherein the feedback number F is the two's complement of the fourth integer p and thereby $F = 2^n - p$;

arithmetic means coupled to said first register means and said second register means, for generating the third integer C from adding the first integer A to the second integer B;

accumulator means coupled to said arithmetic means for storing the third integer C;

overflow means coupled to said accumulator means for storing an overflow integer;

means coupled to said overflow means and said second register means and responsive to the overflow integer, for fetching the feedback number F into said second register B and adding the feedback number F using arithmetic means to the third integer C in said accumulator means; and means coupled to the accumulator means and responsive to the third integer C being greater than the fourth integer p, for reducing the third integer C modulo the fourth integer p.

9. The modulo arithmetic processor chip as set forth in claim 8 wherein said arithmetic means includes a plurality of full adders coupled to said first register means and said second register means, for adding the first integer A to the second integer B.

10. The modulo arithmetic processor chip as set forth in claim 8 wherein said arithmetic means includes a plurality of half adders coupled to said first register means and said second register means, for adding the first integer A to the second integer B.

11. A modulo arithmetic processor chip for adding a first integer A having n-bits to a second integer B having n-bits, wherein the first integer A plus the second integer B equals a third integer C having n-bits, modulo a fourth integer p having n-bits, whereby $C = (A+B) \mod p$, comprising:

first-base-register means for storing the base bits of the first integer A;

first-carry-register means for storing the carry bits of the first integer A;

second-base-register means for storing the base bits of the second integer B;

second-carry-register means for storing the carry bits of the second integer B;

feedback means for generating a first feedback number $F_1$, a second feedback number $F_2$, a third feedback number $F_3$, and a fourth feedback number $F_4$, wherein the first feedback number $F_1$ is the two's complement of the fourth integer p and thereby $F_1 = 2^n - p$, the second feedback number $F_2$ equals two times the first feedback number $F_1$ and thereby $F_2 = 2F_1 \mod p$, the third feedback number $F_3$ equals three times the first feedback number $F_1$ and thereby $F_3 = 3F_1 \mod p$, and the fourth feedback number $F_4$ equals four times the first feedback number $F_1$ and thereby $F_4 = 4F_1 \mod p$;

arithmetic means having a plurality of full adders, coupled to said first-base-register means, said first-carry-register means, said second-base-register means, and said second-carry-register means, for simultaneously adding with said plurality of full adders the base bits and carry bits of the first integer A to the respective base bits of the second integer B to generate a first sum having base bits and carry bits, and subsequently adding with said plurality of full adders the base bits and carry bits of the first sum to the respective carry bits of the second integer B to generate the base bits and the carry bits of the third integer C, respectively;

accumulator-base means coupled to said arithmetic means for storing the base bits of the third integer C;

accumulator-carry means coupled to said arithmetic means for storing the carry bits of the third integer C;

overflow means coupled to said accumulator base means and said accumulator carry means for counting and storing overflow bits as an overflow integer I;

means coupled to said overflow means, said second-base-register means, and said feedback means, and responsive to the overflow integer I=1, 2, 3, or 4, for fetching the feedback number $F_1$, $F_2$, $F_3$, or $F_4$, respectively, from said feedback means into said second-base-register means and adding the feedback number $F_1$, $F_2$, $F_3$, or $F_4$, respectively, using arithmetic means to the third integer C in said accumulator-base means and said accumulator-carry means; and means coupled to the accumulator-base means and responsive to the third integer C being greater than the fourth integer p, for reducing the third integer C modulo the fourth integer p.

12. A modulo arithmetic processor chip for adding a first integer A having n-bits to a second integer B having n-bits, wherein the first integer A plus the second integer B equals a third integer C having n-bits, modulo a fourth integer p having n-bits, whereby $C=(A+B)$ mod p, comprising:

first-base-register means for storing the base bits of the first integer A;

first-carry-register means for storing the carry bits of the first integer A;

second-base-register means for storing the base bits of the second integer B;

second-carry-register means for storing the carry bits of the second integer B;

feedback means for generating a feedback number F, wherein the feedback number F is the two's complement of the fourth integer p and thereby $F=2^n-p$;

arithmetic means coupled to said first-base-register means, said first-carry-register means, said second-base-register means, and said second-carry-register means, for simultaneously adding the base bits and carry bits of the first integer A to the respective base iits of the second integer B to generate a first sum having base bits and carry bits, and subsequently adding the base bits and carry bits of the first sum to the respective carry bits of the second integer B to generate the base bits and carry bits of the third integer C, respectively;

accumulator-base means coupled to said arithmetic means for storing the base bits of the third integer C;

accumulator-carry means coupled to said arithmetic means for storing the carry bits of the third integer C;

overflow means coupled to said accumulator base means and said accumulator carry means for counting and storing overflow bits as an overflow integer I;

means coupled to said overflow means, said second-base-register means, and said feedback means, and responsive to the overflow integer, for fetching the feedback number F from said feedback means and adding the feedback number F to the third integer C; and means coupled to said accumulator-base means and responsive to the third integer C being greater than the fourth integer p, for reducing the third integer C modulo the fourth integer p.

13. The modulo arithmetic processor chip as set forth in claim 12 wherein said arithmetic means includes a plurality of full adders coupled to said first-base-register means, said first-carry-register means, said second-base register means and said second-carry-register means, for simultaneously adding the base bits and carry bits of the first integer A to the respective base bits of the second integer B to generate a first sum having base bits and carry bits, and storing the base bits and carry bits of the first sum in said base accumulator means and said carry accumulator means, respectively.

14. The arithmetic processor chip as set forth in claim 13 further including multiplex means coupled to said plurality of full adders, said first-base-register means, said first-carry register-means, said second-base-register means, said second-carry-register means, said base-accumulator means, and said carry-accumulator means, for switching said plurality of full adders for simultaneously adding the base bits and carry bits of the first sum in said base-accumulator means and said carry accumulator means to the carry bits of the second integer B to generate the third integer C, and storing the base bits and carry bits of the third integer C in said base-accumulator means and said carry accumulator means, respectively.

15. A modulo arithmetic processor chip for multiplying a first integer A having n-bits by a second integer B having n-bits, wherein the first integer A times the second integer B equals a third integer C having n-bits, modulo a fourth integer p having n-bits, whereby $C=A \cdot B$ mod p, comprising:

first register means for storing the first integer A;

second register means for storing the second integer B;

feedback means for generating a feedback number F, wherein the feedback number F is the two's compliment of the fourth integer p and thereby $F=2^n-p$;

first-partial-reduction means coupled to said second register means and responsive to the most significant position of the second integer B shifted left from said second register means for adding the feedback number F to the second integer B, thereby partially reducing the second integer B;

arithmetic means coupled to said first register means, and said second register means, and responsive to the least significant position of the first integer A shifted right from said first register means, for adding the second integer B to the third integer C;

accumulator means coupled to said arithmetic means for storing the third integer C;

overflow means coupled to said accumulator means for counting and storing overflow bits as an overflow integer I;

second-partial-reductions means coupled to said first register means, said second register means, said overflow means and said arithmetic means, and responsive to the completion of multiplying the first integer A by the second integer B, for transferring the overflow integer I into said first register means, transferring the feedback number F into said second register means, and multiplying feedback number F by the overflow integer I to generate a product, and adding the product to the third integer C in said accumulator means; and means coupled to said accumulator means and responsive to the third integer C being greater than the fourth integer p, for reducing third integer C modulo the fourth integer p.

16. A modulo arithmetic processor chip for multiplying a first integer A having n-bits by a second integer B having n-bits, wherein the first integer A times the second integer B equals a third integer C having n-bits, modulo a fourth integer p having n-bits, whereby $C = A \cdot B \mod p$, comprising:

first register means for storing the first integer A;
second register means for storing the second integer B;
feedback means for generating a feedback number F, wherein the feedback number F is the two's complement of the fourth integer p and thereby $F = 2^n - p$;
arithmetic means coupled to said first register means and said second register means, and responsive to the least significant position of the first integer A shifted right from said first register means, for adding the second integer B to the third integer C;
accumulator means coupled to said arithmetic means for storing the third integer C;
overflow means coupled to said accumulator means for counting and storing overflow bits as an overflow integer I;
second-partial-reduction means coupled to said overflow means, said feedback means, said first-register means and said second-register means, and responsive to the completion of multiplying the first integer A by the second integer B, for transferring the overflow integer I into said first register means, transferring the feedback number F into said second register means, and multiplying feedback number F by the overflow integer I to generate a product, and adding the product to the third integer C in said accumulator means; and
means coupled to said accumulator means and responsive to the third integer C being greater than fourth integer p, for reducing the third integer C modulo the fourth integer p.

17. The arithmetic processor chip as set forth in claim 16 wherein said arithmetic means includes a plurality of full adders coupled to said second register means, for simultaneously adding the second integer B to the third integer C.

18. The arithmetic processor chip as set forth in claim 16 wherein said arithmetic means includes a plurality of half adders coupled to said second register means, for simultaneously adding the second integer B to the third integer C.

19. A modulo arithmetic processor chip for multiplying a first integer A having n-bits by a second integer B having n-bits, wherein the first integer A times the second integer B equals a third integer C having n-bits, modulo a fourth integer p having n-bits, whereby $C = A \cdot B \mod p$, comprising:

first-register means for storing the first integer A;
second-register means for storing the second integer B;
feedback means for generating and storing a feedback number F, wherein the feedback number F is the two's compliment of the fourth integer p and thereby $F = 2^n - p$;
first-partial-reduction means coupled to said second register means and responsive to in the most significant position of the second integer B shifted left from said second register means, for adding the feedback number F to the second integer B, thereby partially reducing the second integer B;
arithmetic means coupled to said first register means, and said second register means, and responsive to the least significant position of the first integer A shifted right from said first register means, for adding the second integer B to the third integer C;
accumulator means coupled to said arithmetic means for storing the third integer C; and
means coupled to said accumulator means and responsive to the third integer C being greater than fourth integer p, for reducing the third integer C modulo the fourth integer p.

20. The arithmetic processor chip as set forth in claim 19 wherein said arithmetic means includes a plurality of full adders coupled to said second register means, for simultaneously adding the second integer B to the third integer C.

21. The arithmetic processor chip as set forth in claim 19 wherein said arithmetic means includes a plurality of half adders coupled to said second register means, for simultaneously adding the second integer B to the third integer C.

22. A modulo arithmetic processor chip for multiplying a first integer A having n-bits by a second integer B having n-bits, wherein the first integer A times the second integer B equals a third integer C having n-bits, modulo a fourth integer p having n-bits, whereby $C = A \cdot B \mod p$, comprising:

first-base-register means for storing the base bits of the first integer A;
first-carry-register means for storing the carry bits of the first integer A;
second-base-register means for storing the base bits of the second integer B;
second-carry-register means for storing the carry bits of the second integer B;
feedback means for generating a first feedback number $F_1$, a second feedback number $F_2$, a third feedback number $F_3$, and a fourth feedback number $F_4$, wherein the first feedback number $F_1$ is the two's complement of fourth integer p and thereby $F_1 = 2^n - p$, the second feedback number $F_2$ equals two times first feedback number $F_1$ and thereby $F_2 = 2F_1 \mod p$, the third feedback number $F_3$ equals three times first feedback number $F_1$ and thereby $F_3 = 3F_1 \mod p$, the fourth feedback number $F_4$ equals four times first feedback number $F_1$ and thereby $F_4 = 4F_1 \mod p$;
first-partial-reduction means coupled to said second-base-register means, to said second-carry-register means and to said feedback means and responsive to the most significant base bits and carry bits of the second integer B shifted left from said second-base-register means and said second-carry-register means, for adding first, second, third or fourth feedback number according to a preselected choice of the shifted-left base bits and carry bits of the second integer B, to the second integer B, thereby partially reducing the second integer B;

arithmetic means having a plurality of full adders, coupled to said first-base-register means, said first-carry-register means, said second-base-register means, and said second-carry-register means, and responsive to the least significant position of the first integer A shifted right from said first register means, for simultaneously adding with said plurality of full adders the base bits and carry bits of the second integer B to the respective base bits of the third integer C to generate a first sum having base bits and carry bits, and subsequently adding with said plurality of full adders the base bits and carry bits of the first sum to the respective carry bits of the third integer C;

accumulator-base means coupled to said arithmetic means for storing the base bits of the third integer C;

accumulator-carry means coupled to said arithmetic means for storing the carry bits of the third integer C;

overflow means coupled to said accumulator means for storing an overflow integer I;

second-partial-reduction means coupled to said overflow means, said feedback means, said first-base-register means and said second-base-register means, and responsive to the overflow integer I=1, 2, 3, or 4, respectively, for fetching the first, second, third, or fourth feedback number, respectively, from said feedback means into said second-base-register means and adding the first, second, third, or fourth feedback number, respectively, using arithmetic means to the third integer C in said accumulator-base means and said accumulator-carry means; and means coupled to said accumulator-base-means and responsive to the third integer C being greater than the fourth integer p, for reducing the third integer C modulo the fourth integer p.

23. A modulo arithmetic processor chip for multiplying a first integer A having n-bits by a second integer B having n-bits, wherein the first integer A times the second integer B equals a third integer C having n-bits, modulo a fourth integer p having n-bits, whereby C=A·B mod p, comprising:

first-base-register means for storing the base bits of the first integer A;

first-carry-register means for storing the carry bits of the first integer A;

second-base-register means for storing the base bits of the second integer B;

second-carry-register means for storing the carry bits of the second integer B;

feedback means for generating a first feedback number $F_1$, a second feedback number $F_2$, a third feedback number $F_3$, and a fourth feedback number $F_4$, wherein the first feedback number $F_1$ is the two's complement of fourth integer p and thereby $F_1=2^n-p$, the second feedback number $F_2$ equals two times first feedback number $F_1$ and thereby $F_2=2F_1$ mod p, the third feedback number $F_3$ equals three times first feedback number $F_1$ and thereby $F_3=3F_1$ mod p, the fourth feedback number $F_4$ equals four times first feedback number $F_1$ and thereby $F_4=4F_1$ mod p;

arithmetic means coupled to said first-base-register means, said first-carry-register means, said second-base-register means, and said second-carry-register means, and responsive to the least significant position of the first integer A shifted right from said first register means, for adding the base bits and carry bits of the second integer B to the respective base bits of the third integer C to generate a first sum having base bits and carry bits, and subsequently adding the base bits and carry bits of the first sum to the respective carry bits of the third integer C;

accumulator-base means coupled to said arithmetic means for storing the base bits of the third integer C;

accumulator-carry means coupled to said arithmetic means for storing the carry bits of the third integer C;

overflow means coupled to said accumulator means for storing an overflow integer I;

second-partial-reduction means coupled to said overflow means, said feedback means, said first-base-register means and said second-base-register means, and responsive to the overflow integer I=1, 2, 3, or 4, for fetching the first, second, third, or fourth feedback number, respectively, from said feedback means into said second-base-register means and adding the first, second, third, or fourth feedback number, respectively, using arithmetic means to the third integer C in said accumulator-base means and said accumulator-carry means; and means coupled to said accumulator-base means and responsive to the third integer C being greater than the fourth integer p, for reducing the third integer C modulo the fourth integer p.

24. The modulo arithmetic processor chip as set forth in claim 23 wherein said arithmetic means includes a plurality of full adders coupled to said second-base-register means and said second-carry-register means, for simultaneously adding the base bits and carry bits of the second integer B to the base bits of the third integer C to generate the first sum having base bits and carry bits.

25. The modulo arithmetic processor chip as set forth in claim 24 further including multiplexer means for controlling said plurality of full adders to add the base bits and carry bits of the first sum to the carry bits of the third integer C.

26. A modulo arithmetic processor chip for multiplying a first integer A having n-bits by a second integer B having n-bits, wherein the first integer A times the second integer B equals a third integer C having n-bits, modulo a fourth integer p having n-bits, whereby C=A·B mod p, comprising:

first-base-register means for storing the base bits of the first integer A;

first-carry-register means for storing the carry bits of the first integer A;

second-base-register means for storing the base bits of the second integer B;

second-carry-register means for storing the carry bits of the second integer B;

feedback means for generating a first feedback number $F_1$, a second feedback number $F_2$, a third feedback number $F_3$, and a fourth feedback number $F_4$, wherein the first feedback number $F_1$ is the two's complement of fourth integer p and thereby $F_1=2^n-p$, the second feedback number $F_2$ equals two times first feedback number $F_1$ and thereby $F_2=2F_1$ mod p, the third feedback number $F_3$ equals three times first feedback number $F_1$ and thereby $F_3=3F_1$ mod p, the fourth feedback number $F_4$ equals four times first feedback number $F_1$ and thereby $F_4=4F_1$ mod p;

first-partial-reduction means coupled to said second-base-register means, to said second-carry-register means and to said feedback means and responsive to the most significant base bits and carry bits of the second integer B shifted left from said second-base-register means and said second-carry-register means for adding first, second, third or fourth feedback number according to a preselected choice of the shifted-left base bits and carry bits of the second integer B, to the second integer B, thereby partially reducing the second integer B;

arithmetic means coupled to said first-base-register means, said first-carry-register means, said second-base-register means, and said second-carry-register means, and responsive to the least significant position of the first integer A shifted right from said first register means, for adding the base bits and carry bits of the second integer B to the respective base bits of the third integer C to generate a first sum having base bits and carry bits, and subsequently adding the base bits and carry bits of the first sum to the respective carry bits of the third integer C;

accumulator-base means coupled to said accumulator means for storing the base bits of the third integer C;

accumulator-carry means coupled to said accumulator means for storing the carry bits of the third integer C;

overflow means coupled to said accumulator means for storing an overflow integer I;

means coupled to said accumulator-base means and responsive to the third integer C being greater than the fourth integer p, for reducing the third integer C modulo the fourth integer p.

27. The modulo arithmetic processor chip as set forth in claim 26 wherein said arithmetic means includes a plurality of full adders coupled to said second-base-register means and said second-carry-register means, for simultaneously adding the base bits and carry bits of the second integer B to the base bits of the third integer C to generate the first sum having base bits and carry bits.

28. The modulo arithmetic processor chip as set forth in claim 27 further including multiplexer means for controlling said plurality of full adders to add the base bits and carry bits of the first sum to the carry bits of the third integer C.

29. A modulo arithmetic processor chip for multiplying a first integer A having n-bits by a second integer B having n-bits wherein the first integer A times the second integer B equals a third integer C having n-bits, modulo a fourth integer p having n-bits, whereby $C=A \cdot B$ mod p, comprising:

first-base-register means for storing the base bits of the first integer A;

first-carry-register means for storing the carry bits of the first integer A;

second-base-register means for storing the base bits of the second integer B;

second-carry-register means for storing the carry bits of the second integer B;

feedback means for generating a first feedback number $F_1$, wherein the first feedback number $F_1$ is the two's complement of fourth integer p and thereby $F_1=2^n-p$;

arithmetic means coupled to said first-base-register means, said first-carry-register means, said second-base-register means and said second-carry-register means, and responsive to the least significant position of the first integer A shifted right from said first register means, for adding the base bits and carry bits of the second integer B to the respective base bits of the third integer C to generate a first sum having base bits and carry bits, and subsequently adding the base bits and carry bits of the first sum to the respective carry bits of the third integer C;

accumulator-base means coupled to said arithmetic means for storing the base bits of the third integer C;

accumulator-carry means coupled to said arithmetic means for storing the carry bits of the third integer C;

overflow means coupled to said accumulator means for storing an overflow integer I; and means coupled to said accumulator-base means and responsive to the third integer C being greater than the fourth integer p, for reducing the third integer C modulo the fourth integer p.

30. The modulo arithmetic processor chip as set forth in claim 29 wherein said arithmetic means includes a plurality of full adders coupled to said second-base-register means and said second-carry-register means, for simultaneously adding the base bits and carry bits of the second integer B to the base bits of the third integer C to generate the first sum having base bits and carry bits.

31. The modulo arithmetic processor chip as set forth in claim 30 further including multiplexer means for controlling said plurality of full adders to add the base bits and carry bits of the first sum to the carry bits of the third integer C.

32. A modulo arithmetic processor chip for multiplying a first integer A having n-bits by a second integer B having n-bits, wherein the first integer A times the second integer B equals a third integer C having n-bits, modulo a fourth integer p having n-bits, whereby $C=A \cdot B$ mod p, comprising:

first-base-register means for storing the base bits of the first integer A;

first-carry-register means for storing the carry bits of the first integer A;

second-base-register means for storing the base bits of the second integer B;

second-carry-register means for storing the carry bits of the second integer B;

feedback means for generating a first feedback number $F_1$, a second feedback number $F_2$, a third feedback number $F_3$, and a fourth feedback number $F_4$, wherein the first feedback number $F_1$ is the two's complement of fourth integer p and thereby $F_1=2^n-p$, the second feedback number $F_2$ equals two times first feedback number $F_1$ and thereby $F_2=2F_1$ mod p, the third feedback number $F_3$ equals three times first feedback number $F_1$ and thereby $F_3=3F_1$ mod p, the fourth feedback number $F_4$ equals four times first feedback number $F_1$ and thereby $F_4=4F_1$ mod p;

first-partial-reduction means coupled to said second-base-register means, to said second-carry-register means and to said feedback means and responsive to the most significant base bits and carry bits of the second integer B shifted left from said second-base-register means and said second-carry-register means, for adding first, second, third or fourth feedback number according to a preselected choice of the shifted-left base bits and carry bits of the second integer B, to the second integer B, thereby partially reducing the second integer B;

arithmetic means having a plurality of full adders, coupled to said first-base-register means, said first-carry-register means, said second-base-register means, and said second-carry-register means, and responsive to the least significant position of the first integer A shifted right from said first register means, for simultaneously adding with said plurality of full adders the base bits and carry bits of the second integer B to the respective base bits of the third integer C to generate a first sum having base bits and carry bits, and subsequently adding with said plurality of full adders the base bits and carry bits of the first sum to the respective carry bits of the third integer C;

accumulator-base means coupled to said arithmetic means for storing the base bits of the third integer C;

accumulator-carry means coupled to said arithmetic means for storing the carry bits of the third integer C;

overflow means coupled to said accumulator means for storing an overflow integer I;

second-partial-reduction means coupled to said overflow means, said feedback means, said first-base-register means and said second-base-register means, and responsive to the completion of multiplying the first integer A by the second integer B, for transferring the overflow integer I into said first register means, transferring the first feedback number $F_1$ into said second register means, and multiplying the first feedback number $F_1$ by the overflow integer I to generate a product, and adding the product to the third integer C in said accumulator-base means and said accumulator-carry means; and means coupled to said accumulator-base-means and responsive to the third integer C being greater than the fourth integer p, for reducing the third integer C modulo the fourth integer p.

33. A modulo arithmetic processor chip for multiplying a first integer A having n-bits by a second integer B having n-bits, wherein the first integer A times the second integer B equals a third integer C having n-bits, modulo a fourth integer p having n-bits, whereby C=A·B mod p, comprising:

first-base-register means for storing the base bits of the first integer A;

first-carry-register means for storing the carry bits of the first integer A;

second-base-register means for storing the base bits of the second integer B;

second-carry-register means for storing the carry bits of the second integer B;

feedback means for generating a first feedback number $F_1$, a second feedback number $F_2$, a third feedback number $F_3$, and a fourth feedback number $F_4$, wherein the first feedback number $F_1$ is the two's complement of fourth integer p and thereby $F_1=2^n-p$, the second feedback number $F_2$ equals two times first feedback number $F_1$ and thereby $F_2=2F_1$ mod p, the third feedback number $F_3$ equals three times first feedback number $F_1$ and thereby $F_3=3F_1$ mod p, the fourth feedback number $F_4$ equals four times first feedback number $F_1$ and thereby $F_4=4F_1$ mod p;

arithmetic means coupled to said first-base-register means, said first-carry-register means, said second-base-register means, and said second-carry-register means, and responsive to the least significant position of the first integer A shifted right from said first register means, for adding the base bits and carry bits of the second integer B to the respective base bits of the third integer C to generate a first sum having base bits and carry bits, and subsequently adding the base bits and carry bits of the first sum to the respective carry bits of the third integer C;

accumulator-base means coupled to said arithmetic means for storing the base bits of the third integer C;

accumulator-carry means coupled to said arithmetic means for storing the carry bits of the third integer C;

overflow means coupled to said accumulator means for storing an overflow integer I;

second-partial-reduction means coupled to said overflow means, said feedback means, said first-base-register means and said second-base-register means, and responsive to the completion of multiplying the first integer A by the second integer B, for transferring the overflow integer I into said first register means, transferring the first feedback number $F_1$ into said second register means, and multiplying the first feedback number $F_1$ by the overflow integer I to generate a product, and adding the product to the third integer C in said accumulator-base means and said accumulator-carry means; and means coupled to said accumulator-base means and responsive to the third integer C being greater than the fourth integer p, for reducing the third integer C modulo the fourth integer p.

34. The modulo arithmetic processor chip as set forth in claim 33 wherein said arithmetic means includes a plurality of full adders coupled to said second-base-register means and said second-carry-register means, for simultaneously adding the base bits and carry bits of the second integer B to the base bits of the third integer C to generate the first sum having base bits and carry bits.

35. The modulo arithmetic processor chip as set forth in claim 34 further including multiplexer means for controlling said plurality of full adders to add the base bits and carry bits of the first sum to the carry bits of the third integer C.

36. A method using a modulo arithmetic processor chip for adding a first integer A having n-bits to a second integer B having n-bits, wherein the first integer A plus the second integer B equals a third integer C having n-bits, modulo a fourth integer p having n-bits, whereby C=(A+B) mod p, comprising the steps, performed by said modulo arithmetic processor chip, of:

storing the first integer A in first register means;

storing the second integer B in second register means;

generating and storing a feedback number F in feedback means, wherein the feedback number F is the two's complement of the fourth integer p and thereby $F=2^n-p$;

generating the third integer C by adding the first integer A to the second integer B in arithmetic means which is coupled to said first register means and said second register means;

storing the third integer C in accumulator means which is coupled to said arithmetic means;

storing an overflow integer in overflow means which is coupled to said accumulator means;

fetching the feedback number F into said second register B and adding the feedback number F using arithmetic means to the third integer C in said accumulator means; and reducing the third integer C modulo the fourth integer p in means coupled to the accumulator means, when the third integer C is greater than the fourth integer p.

37. A method using a modulo arithmetic processor chip for adding a first integer A having n-bits to a second integer B having n-bits, wherein the first integer A plus the second integer B equals a third integer C having n-bits, modulo a fourth integer p having n-bits, whereby C=(A+B) mod p, comprising the steps, performed by said modulo arithmetic processor chip, of:

storing the base bits of the first integer A in first-base-register means;

storing the carry bits of the first integer A in first-carry-register means;

storing the base bits of the second integer B in second-base-register means;

storing the carry bits of the second integer B in second-carry-register means;

generating a first feedback number $F_1$, a second feedback number $F_2$, a third feedback number $F_3$, and a fourth feedback number $F_4$ in feedback means, wherein the first feedback number $F_1$ is the two's complement of the fourth integer p and thereby $F_1 = 2^n - p$, the second feedback number $F_2$ equals two times the first feedback number $F_1$ and thereby $F_2 = 2F_1$ mod p, the third feedback number $F_3$ equals three times the first feedback number $F_1$ and thereby $F_3 = 3F_1$ mod p, and the fourth feedback number $F_4$ equals four times the first feedback number $F_1$ and thereby $F_4 = 4F_1$ mod p;

simultaneously adding in arithmetic means which is coupled to said first-base-register means, said first-carry-register means, said second-base-register means, and said second-carry-register means, the base bits and carry bits of the first integer A to the respective base bits of the second integer B to generate a first sum having base bits and carry bits, and subsequently adding the base bits and carry bits of the first sum to the respective carry bits of the second integer B to generate the base bits and carry bits of the third integer C, respectively;

storing the base bits of the third integer C in accumulator-base means;

storing the carry bits of the third integer C in accumulator-carry means;

counting and storing overflow bits as an overflow integer I in overflow means;

fetching the feedback number $F_1$, $F_2$, $F_3$, or $F_4$, respectively, from said feedback means into said second-base-register means and adding the feedback number $F_1$, $F_2$, $F_3$, or $F_4$, respectively, using arithmetic means to the third integer C in said accumulator-base means and said accumulator-carry means in response to the overflow integer I=1, 2, 3, or 4; and reducing the third integer C modulo the fourth integer in response to the third integer C being greater than the fourth integer p.

38. A method using a modulo arithmetic processor chip for adding a first integer A having n-bits to a second integer B having n-bits, wherein the first integer A plus the second integer B equals a third integer C having n-bits, modulo a fourth integer p having n-bits, whereby C=(A+B) mod p, comprising the steps, performed by said modulo arithmetic processor chip, of:

storing the base bits of the first integer A in first-base-register means;

storing the carry bits of the first integer A in first-carry-register means;

storing the base bits of the second integer B in second-base-register means;

storing the carry bits of the second integer B in second-carry-register means;

generating a feedback number F in feedback means, wherein the feedback number F is the two's complement of the fourth integer p and thereby $F = 2^n - p$;

simultaneously adding, the base bits and carry bits of the first integer A to the respective base bits of the second integer B to generate a first sum having base bits and carry bits, and subsequently adding the base bits and carry bits of the first sum to the respective carry bits of the second integer B to generate the base bits and carry bits of the third integer C, respectively;

storing the base bits of the third integer C in accumulator-base means;

storing the carry bits of the third integer C in accumulator-carry means;

counting and storing in overflow means overflow bits as an overflow integer I;

fetching the feedback number F from said feedback means and adding the feedback number F to the third integer C; and reducing the third integer C modulo the fourth integer p in response to the third integer C being greater than the fourth integer p.

39. A method using a modulo arithmetic processor chip for multiplying a first integer A having n-bits by a second integer B having n-bits, wherein the first integer A times the second integer B equals a third integer C having n-bits, modulo a fourth integer p having n-bits, whereby C=A·B mod p, comprising the steps, performed by said modulo arithmetic processor chip, of:

storing the first integer A in first register means;

storing the second integer B in second register means;

generating a feedback number F in feedback means, wherein the feedback number F is the two's compliment of the fourth integer p and thereby $F = 2^n - p$;

adding the feedback number F to the second integer B in response to the most significant position of the second integer B shifted left from said second register means, thereby partially reducing the second integer B;

adding the second integer B to the third integer C in arithmetic means in response to the least significant position of the first integer A shifted right from said first register means;

storing the third integer C in accumulator means;

counting and storing overflow bits as an overflow integer I in overflow means;

transferring the overflow integer I into said first register means, transferring the feedback number F into said second register means, and multiplying feedback number F by the overflow integer I to generate a product, and adding the product to the third integer C in said accumulator means in second-partial-reductions means in response to the completion of multiplying the first integer A by the second integer B; and reducing third integer C modulo the fourth integer p in response to the third integer C being greater than the fourth integer p.

40. A method using a modulo arithmetic processor chip for multiplying a first integer A having n-bits by a second integer B having n-bits, wherein the first integer A times the second integer B equals a third integer C having n-bits, modulo a fourth integer p having n-bits, whereby C=A·B mod p, comprising the steps, performed by said modulo arithmetic processor chip, of:

storing the first integer A in first register means;
storing the second integer B in second register means;
generating a feedback number F in feedback means, wherein the feedback number F is the two's complement of the fourth integer p and thereby $F=2^n-p$;
adding in arithmetic means the second integer B to the third integer C in response to the least significant position of the first integer A shifted right from said first register means;
storing the third integer C in accumulator means;
counting and storing overflow bits as an overflow integer I in overflow means;
transferring the overflow integer I into said first register means, transferring the feedback number F into said second register means, and multiplying feedback number F by the overflow integer I to generate a product, and adding the product to the third integer C in said accumulator means, in response to the completion of multiplying the first integer A by the second integer B; and
reducing the third integer C modulo the fourth integer p in response to the third integer C being greater than fourth integer p:

41. A modulo arithmetic processor chip for multiplying a first integer A having n-bits by a second integer B having n-bits, wherein the first integer A times the second integer B equals a third integer C having n-bits, modulo a fourth integer p having n-bits, whereby C=A·B mod p, comprising the steps, performed by said modulo arithmetic processor chip, of:

storing the first integer A in first-register means;
storing the second integer B in second-register means;
generating and storing a feedback number F in feedback means, wherein the feedback number F is the two's compliment of the fourth integer p and thereby $F=2^n-p$;
adding the feedback number F to the second integer B in response to the most significant position of the second integer B shifted left from second register means, thereby partially reducing the second integer B;
adding the second integer B to the third integer C in arithmetic means in response to the least significant position of the first integer A shifted right from said first register means;
storing the third integer C in accumulator means; and
reducing the third integer C modulo the fourth integer p in response to the third integer C being greater than fourth integer p.

42. A method using a modulo arithmetic processor chip for multiplying a first integer A having n-bits by a second integer B having n-bits, wherein the first integer A times the second integer B equals a third integer C having n-bits, modulo a fourth integer p having n-bits, whereby C=A·B mod p, comprising the steps, performed by said modulo arithmetic processor chip, of:

storing the base bits of the first integer A in first-base-register means;
storing the carry bits of the first integer A in first-carry-register means;
storing the base bits of the second integer B in second-base-register means;
storing the carry bits of the second integer B in second-carry-register means;
generating a first feedback number $F_1$, a second feedback number $F_2$, a third feedback number $F_3$, and a fourth feedback number $F_4$ in feedback means, wherein the first feedback number $F_1$ is the two's complement of fourth integer p and thereby $F_1=2^n-p$, the second feedback number $F_2$ equals two times first feedback number $F_1$ and thereby $F_2=2F_1$ mod p, the third feedback number $F_3$ equals three times first feedback number $F_1$ and thereby $F_3=3F_1$ mod p, the fourth feedback number $F_4$ equals four times first feedback number $F_1$ and thereby $F_4=4F_1$ mod p;
adding first, second, third or fourth feedback number according to a preselected choice of the shifted-left base bits and carry bits of the second integer B, to the second integer B in response to the most significant base bits and carry bits of the second integer B shifted left from said second-base-register means and said second-carry-register means, thereby partially reducing the second integer B;
adding the base and carry bits of the second integer B to the respective base bits of the third integer C to generate a first sum having base bits and carry bits, and subsequently adding the base bits and carry bits of the first sum to the respective carry bits of the third integer C in response to the least significant position of the first integer A shifted right from said first register means;
storing the base bits of the third integer C in accumulator-base means;
storing the carry bits of the third integer C in accumulator-carry means;
storing an overflow integer I in overflow means;
fetching the first, second, third, or fourth feedback number, respectively, from said feedback means into said second-base-register means and adding the first, second, third, or fourth feedback number, respectively, using arithmetic means to the third integer C in said accumulator-base means and said accumulator-carry means in response to the overflow integer I=1, 2, 3, or 4, respectively; and
reducing the third integer C modulo the fourth integer p in response to the third integer C being greater than the fourth integer p.

43. A method using a modulo arithmetic processor chip for multiplying a first integer A having n-bits by a second integer B having n-bits, wherein the first integer A times the second integer B equals a third integer C having n-bits, modulo a fourth integer p having n-bits, whereby C=A·B mod p, comprising the steps, performed by said modulo arithmetic processor chip, of:

storing the base bits of the first integer A in first-base-register means;
storing the carry bits of the first integer A in first-carry-register means;

storing the base bits of the second integer B in second-base-register means;

storing the carry bits of the second integer B in second-carry-register means;

generating a first feedback number $F_1$, a second feedback number $F_2$, a third feedback number $F_3$, and a fourth feedback number $F_4$ in feedback means, wherein the first feedback number $F_1$ is the two's complement of fourth integer p and thereby $F_1=2^n-p$, the second feedback number $F_2$ equals two times first feedback number $F_1$ and thereby $F_2=2F_1$ mod p, the third feedback number $F_3$ equals three times first feedback number $F_1$ and thereby $F_3=3F_1$ mod p, the fourth feedback number $F_4$ equals four times first feedback number $F_1$ and thereby $F_4=4F_1$ mod p;

adding first, second, third or fourth feedback number according to a preselected choice of the shifted-left base bits and carry bits of the second integer B, to the second integer B in response to the most significant base bits and carry bits of the second integer B shifted left from said second-base-register means and said second-carry-register means, thereby partially reducing the second integer B;

adding the base bits and carry bits of the second integer B to the respective base bits of the third integer C to generate a first sum having base bits and carry bits, and subsequently adding the base bits and carry bits of the first sum to the respective carry bits of the third integer C in response to the least significant position of the first integer A shifted right from said first register means;

storing the base bits of the third integer C in accumulator-base means;

storing the carry bits of the third integer C in accumulator-carry means;

storing an overflow integer I in overflow means;

transferring in second-partial-reduction means the overflow integer I into said first register means, transferring the first feedback number $F_1$ into said second register means, and multiplying the first feedback number $F_1$ by the overflow integer I to generate a product, and adding the product to the third integer C in said accumulator-base means and said accumulator-carry means in response to the completion of multiplying the first integer A by the second integer B; and reducing the third integer C modulo the fourth integer p, in response to the third integer C being greater than the fourth integer p.

44. A method using a modulo arithmetic processor chip for adding a first integer A having n-bits to a second integer B having n-bits, wherein the first integer A plus the second integer B equals a third integer C having n-bits, modulo a fourth integer p having n-bits, whereby $C=(A+B)$ mod p, comprising the steps, performed by said modulo arithmetic processor chip, of:

storing the first integer A in first register means;

storing the second integer B in second register means;

generating and storing a feedback number F in feedback means, wherein the feedback number F is the two's complement of the fourth integer p and thereby $F=2^n-p$;

generating the third integer C by adding the first integer A to the second integer B;

storing the third integer C in accumulator means;

storing an overflow integer in overflow means;

fetching the feedback number F into said second register B and adding the feedback number F to the third integer C; and reducing the third integer C modulo the fourth integer p, when the third integer C is greater than the fourth integer p.

* * * * *

UNITED STATES PATENT AND TRADEMARK OFFICE
CERTIFICATE OF CORRECTION

PATENT NO. : 4,891,781
DATED : January 2, 1990
INVENTOR(S) : JIMMY K. OMURA

It is certified that error appears in the above-identified patent and that said Letters Patent is hereby corrected as shown below:

Column 4,  line 5   change "-F[1]2=F[0]" to --F[1]2-F[0]--;

line 46  change "$(X^{2k-1})Z[m-1]k=1,2$" to

--$(X^{2k-1})Z[m-1]$ k = 1, 2--;

Column 6,  line 19  change "$\hat{A}_{21}+A_2[0]$" to --$\hat{A}_{21} = A_2[0]$--;

Column 7,  line 6   change "$S=2B_2[n-1]+B_1[n-1] + B_2[n-2].$" to --$S = 2B_2[n-1] + B_1[n-1] + \hat{B}_2[n-2]$--;

line 15  change "$\hat{S} = 2\hat{B}_2[n-1] + B_1[n-1] + B_2[n-1]$" to --$\hat{S} = 2\hat{B}_2[n-1] + B_1[n-1] + B_2[n-2]$--;

UNITED STATES PATENT AND TRADEMARK OFFICE
CERTIFICATE OF CORRECTION

PATENT NO. : 4,891,781

DATED : January 2, 1990

Page 2 of 2

INVENTOR(S) : Jimmy K. Omura

It is certified that error appears in the above-identified patent and that said Letters Patent is hereby corrected as shown below:

line 28    change "If $r_1=1$" to --If $\hat{r}_1 = 1$--;

Column 8,    line 11    change "$2^n+2=2^{n+1}$" to

--$2^n \cdot 2 = 2^{n+1}$--;

Column 9,    line 8     change "Y< $\leftarrow$ C" to -- Y $\leftarrow$ C--;

Column 15,   line 53    change "iits" to --bits--.

Signed and Sealed this

Tenth Day of March, 1992

*Attest:*

HARRY F. MANBECK, JR.

*Attesting Officer*                        *Commissioner of Patents and Trademarks*